(12) United States Patent
Gallo

(10) Patent No.: US 11,014,671 B2
(45) Date of Patent: May 25, 2021

(54) TOW CABLE SYSTEM AND METHOD OF USE

(71) Applicant: TGALTO Holding, LLC, Dover, DE (US)

(72) Inventor: Michael J. Gallo, San Bernardino, CA (US)

(73) Assignee: Fenix Space, Inc., San Bernardino, CA (US)

( * ) Notice: Subject to any disclaimer, the term of this patent is extended or adjusted under 35 U.S.C. 154(b) by 254 days.

(21) Appl. No.: 15/973,346

(22) Filed: May 7, 2018

(65) Prior Publication Data

US 2020/0047885 A1 Feb. 13, 2020

Related U.S. Application Data

(60) Provisional application No. 62/503,277, filed on May 8, 2017.

(51) Int. Cl.
*B64D 3/00* (2006.01)
*B64C 31/02* (2006.01)
*B64D 1/10* (2006.01)
*B64D 1/12* (2006.01)

(52) U.S. Cl.
CPC ............... *B64D 3/00* (2013.01); *B64C 31/02* (2013.01); *B64D 1/10* (2013.01); *B64D 1/12* (2013.01)

(58) Field of Classification Search
CPC .. B64C 31/02; B64D 1/10; B64D 1/12; B64D 3/00
USPC ....................................................... 244/1 TD
See application file for complete search history.

(56) References Cited

U.S. PATENT DOCUMENTS

| | | | | |
|---|---|---|---|---|
| 1,418,783 A | * | 6/1922 | Fokker | B64D 3/00 244/3 |
| 2,389,132 A | * | 11/1945 | Borgelt | H02G 7/056 244/3 |
| 2,395,172 A | * | 2/1946 | Dean | B64D 3/00 244/3 |
| 2,396,453 A | * | 3/1946 | Windle | B64D 3/00 33/1 F |
| 2,422,662 A | * | 6/1947 | Fahrney | B64D 3/00 244/3 |
| 2,425,309 A | * | 8/1947 | Ennis | B64D 5/00 280/504 |
| 2,432,548 A | * | 12/1947 | Taylor | B64D 3/00 244/3 |

(Continued)

FOREIGN PATENT DOCUMENTS

GB          2250254 A * 6/1992 ............. B60D 1/182

OTHER PUBLICATIONS

International Search Report and the Written Opinion of the International Searching Authority PCT/US2019/030966 dated Jul. 22, 2019.

*Primary Examiner* — Claude J Brown
(74) *Attorney, Agent, or Firm* — Lodestone Legal Group; Jeromye V. Sartain

(57) ABSTRACT

A tow cable system and method of use wherein, in the context of towed flight of a glider behind an aircraft, positive load or tension of the cable therebetween is achieved through one or more of cable design and material selection, cable pre-tensioning, in-flight cable tensioning, and/or load dampening device(s), and the related interplay of such various components or sub-systems of the overall tow cable system.

20 Claims, 9 Drawing Sheets

(56) References Cited

U.S. PATENT DOCUMENTS

| | | | | |
|---|---|---|---|---|
| 2,433,893 | A * | 1/1948 | Cowgill, Jr. | B64D 3/00 244/63 |
| 2,440,737 | A * | 5/1948 | Cawein | H01C 21/30 343/707 |
| 2,449,532 | A * | 9/1948 | Leydorf | G01S 1/02 340/979 |
| 2,460,194 | A * | 1/1949 | Schultz | B63G 7/04 83/177 |
| 2,621,005 | A | 12/1952 | Turpin | |
| 2,649,262 | A * | 8/1953 | Fahrney | G05D 1/0038 244/3 |
| 2,723,812 | A * | 11/1955 | Hohmann | B64F 1/08 244/3 |
| 3,113,747 | A * | 12/1963 | Smith | B64D 5/00 244/3 |
| 3,958,455 | A * | 5/1976 | Russell | G01L 1/22 73/862.68 |
| 3,968,725 | A | 7/1976 | Holzhauer | |
| 5,083,723 | A | 1/1992 | Grieb et al. | |
| 5,626,310 | A * | 5/1997 | Kelly | B64C 25/08 244/171.4 |
| 6,012,407 | A | 1/2000 | Farley | |
| 6,119,617 | A | 9/2000 | Oswell | |
| 6,913,224 | B2 * | 7/2005 | Johansen | B64D 3/00 244/1 TD |
| 7,125,031 | B1 | 10/2006 | Schoonover | |
| 8,727,264 | B1 * | 5/2014 | Rutan | B64D 3/00 244/158.1 |
| 8,910,902 | B2 | 12/2014 | Speer | |
| 9,211,772 | B2 * | 12/2015 | Brown | B60D 1/18 |
| 9,944,410 | B1 * | 4/2018 | Budd | B64C 31/02 |
| 2006/0208136 | A1 * | 9/2006 | Cook | B64G 1/005 244/171.3 |
| 2012/0091259 | A1 * | 4/2012 | Morris | B64C 27/02 244/17.13 |
| 2013/0062464 | A1 | 3/2013 | Speer | |
| 2016/0363685 | A1 * | 12/2016 | Giordana | B64D 3/00 |
| 2019/0168887 | A1 * | 6/2019 | Burgener | B64D 5/00 |

\* cited by examiner

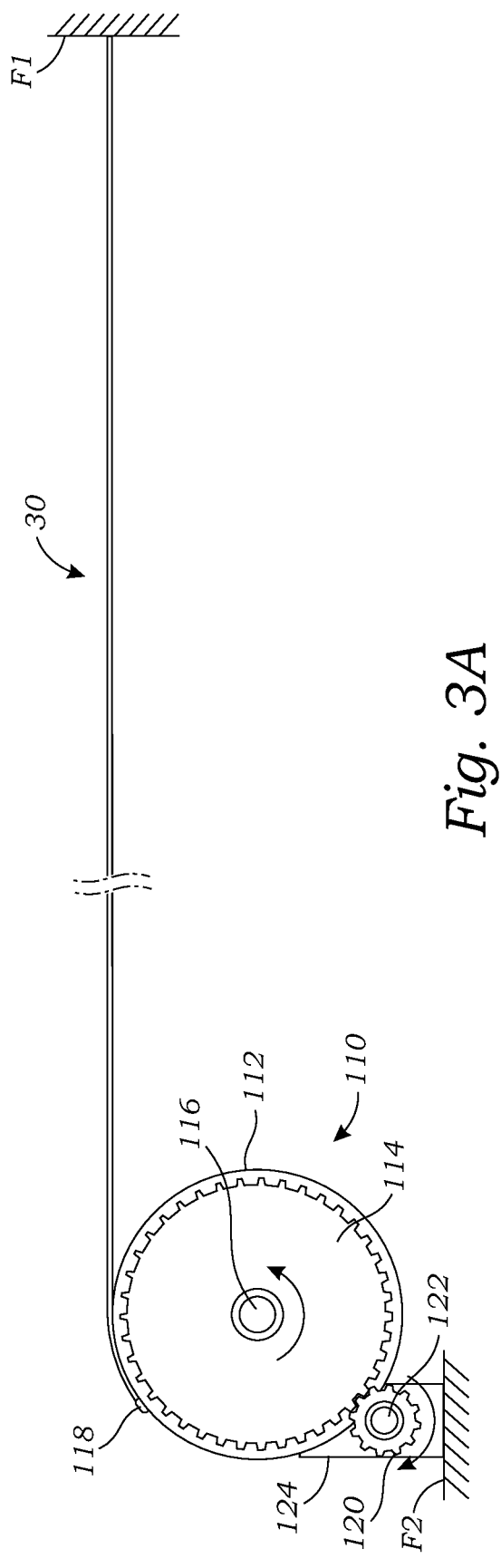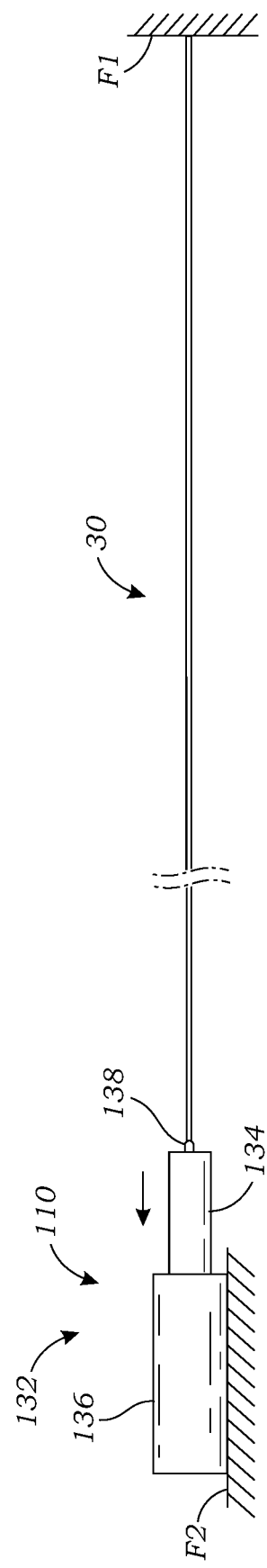

TOW CABLE SYSTEM AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/503,277 filed May 8, 2017, and entitled "Tow Cable System and Method of Use." The contents of the aforementioned application is incorporated herein by reference.

BACKGROUND

The subject of this patent application relates generally to air launch from a towed vehicle, and more particularly to a tow cable system and method of use configured for minimizing oscillation load transference to the towing and/or towed vehicles.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, a limited number of differing types of launch vehicles have historically been available for placing spacecraft such as satellites and the like into orbit around the earth. Virtually all are currently launched under rocket power from a fixed launch pad. This limits the rapidity with which launches can be performed to the time required to prepare the launch pad, assemble the launch vehicle on the pad, place the spacecraft on the vehicle, load propellant into the vehicle, verify that its systems are operating properly, and perform the launch. When the requirement arises to place a spacecraft into a specific orbital plane with respect to the fixed stars, the opportunity to launch is limited to a very short time as the orbital plane passes over the launch site. This time, referred to as the launch window, can be as short as a few seconds if the desired orbital plane is highly inclined to the equator and the launch pad is at a low latitude. If any operation leading up to launch is delayed, the launch window may be missed, and the launch may have to be delayed until the next opportunity. The complexity of launch operations is often such that the next passage of the desired orbital plane occurs before the vehicle can be made ready for another attempt. Maintaining a launch crew on site and repeatedly performing pre-launch operations is a significant contributor to the high cost of ground launch operations.

Pad-launched vehicles can deliver spacecraft only to certain orbital inclinations by virtue of the geographic location of the launch pad. Safety concerns related to flying over inhabited land masses restrict the direction in which a vehicle can be launched from a given pad, and consequently limit the maximum inclination of the orbit which can be achieved. The minimum inclination which can be achieved from a fixed launch pad is determined by and equal to the geographic latitude at which the pad is situated. Though propulsive maneuvers can be performed to change orbital inclination once the spacecraft is in orbit, the weight of propellant required to do so is prohibitive for changes greater than 5 or so degrees.

In addition, launch pad construction is very costly, as is launch pad maintenance and post-launch refurbishment. These costs are reflected in the cost of launch. The nature of the earth's geography is such that only a small number of remote locations, at the equator, are suitable for launching into orbits of arbitrary inclination. For launch service providers who do not have access to these locations, multiple launch sites at various locations must be built in order to be able to place spacecraft into orbits of arbitrary inclination. The cost of multiple launch sites can be prohibitive, so that launch service providers are unable to afford enough sites to launch into orbits of arbitrary inclination. This results in a restriction of the types of missions that can be performed by a given launch service provider.

As a result, there have been proposed more recently technologies or approaches wherein the launch vehicle is carried on board a conventional aircraft. The aircraft can fly to an arbitrary geographic location, where the launch vehicle is released and propels its payload (spacecraft) into orbit. This operation is referred to as "air-launch," and vehicles so configured as "air-launched." An alternative way of regarding air-launch, appropriate when applied to launch vehicles capable of taking off from the ground, is to consider the launch aircraft as a "zero-stage." This parlance is commonly used to describe propulsion systems added to existing launch vehicles to augment their performance by raising them to a certain altitude and velocity before the launch vehicle's own propulsion system can be ignited. This reduces the total energy the existing launch vehicle must add to the payload, and translates into either greater payload capacity or into placing the same payload into a more energetic orbit. Reference to the launch aircraft as a "zero-stage" would apply in cases where the launch vehicle is either capable of taking off from the ground under its own power, or where the launch vehicle was not specifically designed to be air-launched.

Initial air launch approaches were relegated to carrying the launch vehicle on the conventional aircraft as through coupling or attachment. One example is Orbital Sciences Corporation's Pegasus™ aircraft-launched system, in which the launch vehicle is carried by its launch aircraft, by direct attachment either to an underwing pylon or a special fitting beneath the aircraft fuselage. Other proposed launch vehicles which are intended to be launched by an aircraft are all designed to be carried by the aircraft in some fashion, either on top of the aircraft, under the wing, or inside the cargo compartment. Some launch vehicles used lifting surfaces to complement the lift of the aircraft and facilitate flight upon detachment, while others did not, but in any case, to that point, there were no known designs wherein the launch vehicle had aerodynamic lift equal to or greater than the vehicle's launch weight at an indicated airspeed equal to that of the launch aircraft.

Each of these "piggy-back" or other attachment approaches to air-launch of a launch vehicle were found to suffer from the same set of deficiencies: (1) the maximum weight of the launch vehicle is limited to the weight that the carrier aircraft can safely lift to the required altitude; (2) there is risk associated with carrying the launch vehicle, which typically contains large amounts of explosive propellant, on or in a manned launch aircraft; (3) the separation of the launch vehicle from the aircraft can introduce dynamic and sometimes severe loads to the launch vehicle which are in turn transmitted to the spacecraft; (4) externally-carried launch vehicles are subjected to the noise from the carrier aircraft's engines, and to noise generated by the complex air flow around the launch vehicle if it projects into the freestream, imposing random vibration on the spacecraft; (5) the cost and complexity of modifications to the carrier aircraft permitting it to carry the launch vehicle increase dramatically with launch vehicle size; and (6) there is a risk to the aircraft crew from a multitude of failures which can occur when separating a launch vehicle from the aircraft.

Accordingly, technologies were then proposed in connection with launch vehicles for placing spacecraft (e.g., satellites) into orbit around the earth wherein such launch vehicles were equipped with lift producing surfaces of sufficient capacity to permit the launch vehicles to be towed as gliders behind conventional aircraft, thus referred to as "tow-launch," and vehicles so configured as "tow-launched." Indeed, in the 1990's, Kelly Space & Technology, Inc. designed and developed the "Eclipse" Tow Launch System for relatively low-cost access to space using air-towing as the primary initial launch stage in lieu of conventional ground-based launch facilities, which tow-launch approach was believed to be an improvement over "conventional air-launch" approaches employed or proposed previously as discussed above. The "Eclipse" Tow Launch System was successfully tested in the late 1990's in conjunction with NASA and the U.S. Air Force.

More particularly, in U.S. Pat. Nos. 5,626,310 and 6,029,928 to Kelly Space & Technology, Inc., there were proposed orbital launch vehicles equipped with aerodynamic lifting surfaces enabling them to be towed as gliders behind conventional aircraft, and the method of towing these launch vehicles using a flexible cable to connect them with a conventional aircraft, for placing spacecraft into low earth orbit at greatly reduced cost compared to then-current ground launch and orbital air-launch systems. The lift from the aerodynamic surfaces enables the launch vehicles to be towed by means of a flexible cable from a conventional runway using existing aircraft. As with "conventional air-launch," this permits spacecraft launch into orbit to originate from any conventional runway consistent with constraints of public safety, thus eliminating the need to build dedicated launch pads at geographic locations from which a full range of orbital inclinations can be reached. The method of towing the launch vehicle, utilizing the lift of its wings to partially or fully offset its weight, permits at least an order of magnitude increase in the weight of vehicle which can be launched compared to "conventional air-launch" methods whereby the launch vehicle is carried on or within a conventional aircraft. This in turn enables an order of magnitude increase in the weight of spacecraft which can benefit from the inherent flexibility and low cost of "tow-launch." The tow-launch method also requires fewer and simpler modifications to a conventional aircraft than do any other current or proposed air-launch methods.

More recently, in U.S. Pat. No. 8,727,264, inventor Elbert Rutan proposed an orbital launch system and its method of operation using a maneuver to improve the launch condition of a booster rocket and payload. A towed launch aircraft, to which the booster rocket is mounted, is towed to a predetermined elevation and airspeed. The towed launch aircraft begins the maneuver by increasing its lift, thereby increasing the flight path angle, which increases the tension on the towline connecting the towed launch aircraft to a towing aircraft. The increased tension accelerates the towed launch aircraft and booster rocket, while decreasing the speed (and thus the kinetic energy) of the towing aircraft, while increasing kinetic energy of the towed launch aircraft and booster rocket by transferring energy from the towing aircraft. The potential energy of the towed launch aircraft and booster rocket is also increased, due to the increased lift. The booster rocket is released and ignited, completing the launch.

Most recently, in U.S. Pat. No. 9,944,410 to NASA and entitled "System and Method for Air Launch from a Towed Aircraft," there is disclosed such a system and method of air launching a powered launch vehicle into space or high altitude. More specifically, the invention is a tow aircraft which tows an unpowered glider, with the powered launch vehicle attached thereto, to launch altitude. The powered launch vehicle is released from the unpowered glider and powered on for launch.

Despite the early successes of tow-launch and all indications being that it may be the preferred alternative to ground-launch, and space launch approach generally, for satellite and other orbital deployment, challenges have remained. Key design, construction, assembly and integration considerations for the safe, sound and effective use of tow-launch techniques involve, and in many respects hinge on, the elongation and dampening properties of the integrated tow cable system. Elongation properties of the selected tow cable can introduce catastrophic levels of excessive structural loads into the towing and/or towed vehicle(s) through exacerbation and/or compounding of oscillation loads, sometimes referred to as the "bungee effect," which may be experienced prior to and/or during the Rutan or NASA towed launch aircraft pull-up maneuver, for example, as well as in a variety of other tow-launch methods. In applications where there are relatively high resistance loads on the towed vehicle, such as significant drag that ensures the tow cable system is under constant positive tension, the bungee effect can actually assist in dampening the loads transferred to the towing and towed vehicles. However, in the case of a towed vehicle, aerodynamic drag is often not significant enough to ensure tension is maintained in the tow cable system such that oscillations from positive to negative tension loads occur, as again might occur in the Rutan or NASA method at least prior to the pull-up maneuver. Without intervention, these loads will typically increase following each transition from positive to negative tension that ultimately compound to increase loading to levels sufficient to exceed the structural capacity of the towing and/or towed vehicle(s), thereby potentially causing catastrophic structural failure.

Since integration of different cable construction materials, individual cable strand combinations, and cable weave configurations as well as the introduction of dampening techniques and/or devices all affect cable elongation and dampening properties, it is important that these considerations be addressed in any tow cable system design, construction and integration to maximize operational safety and minimize the risk of catastrophic failure. In addition, initial loading and/or pre-tensioning of the tow cable system can affect tow cable elongation properties during subsequent cable loading events. One consideration, then, is selection of cable construction materials that reduce elongation following initial pre-tensioning or pre-loading, as limiting the tow cable return to its initial elongation state assists in dampening oscillation loading transmitted to the towing and towed vehicles. In-flight techniques in terms of aerodynamic influences from the towed vehicle and towing vehicle acceleration control may also be employed to maintain desired tow cable tension. Any combination of such improvements may be employed in minimizing oscillation load transference to the towing or towed vehicles during launch or flight.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a tow cable system and method of use. In at least one embodiment, in the context of towed flight of a glider behind an aircraft, positive load or tension of the cable therebetween is achieved through one or more of cable design and material selection, cable pre-tensioning, in-flight cable tensioning, and/or load dampening device(s), and the related interplay of such various components or sub-systems of the overall tow cable system.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 3A is a schematic side view of tow cable installed within an exemplary tensioner assembly, in accordance with at least one embodiment;

FIG. 3B is a schematic side view of tow cable installed within an alternative exemplary tensioner assembly, in accordance with at least one embodiment;

Figure 1:
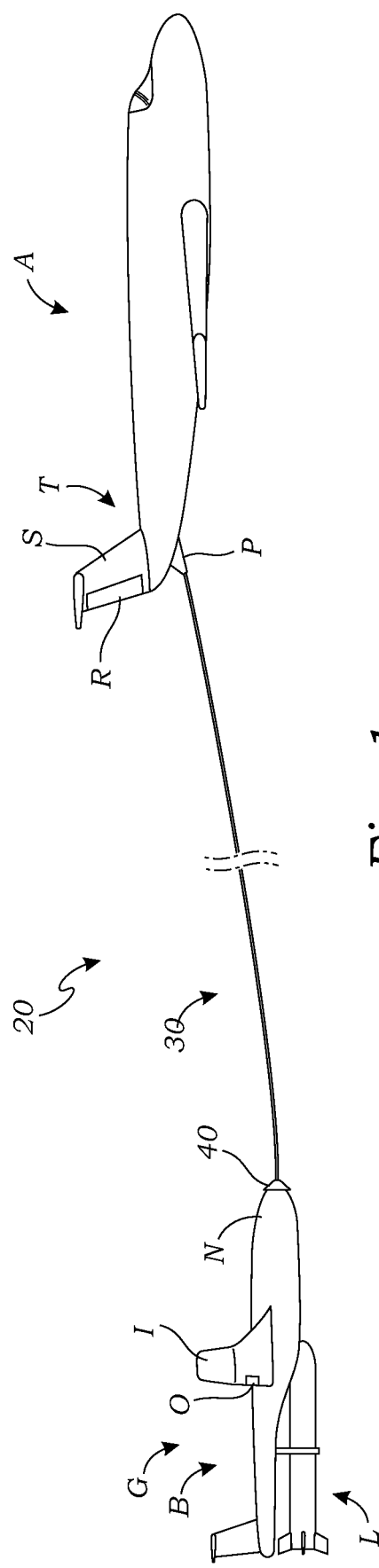
FIG. 1 is a schematic side view of an exemplary tow cable system in use in a tow-launch configuration between an aircraft and a towed glider carrying a launch vehicle, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

In general, there is shown in FIG. 1 an exemplary embodiment of a tow cable system 20 according to aspects of the present invention in use in a tow-launch configuration as installed between an aircraft A and a towed glider G carrying a launch vehicle L. While somewhat traditional and nondescript aircraft A and glider G are shown, it will be appreciated that the invention is not so limited but may entail any towing body or towed body now known or later developed suitable for any such towed flight application. The tow cable system 20 essentially comprises a tow cable 30 with glider connector 40. As a threshold matter, it will be appreciated by those skilled in the art that the schematic of FIG. 1 is a simplified representation that is not to be taken literally or to scale. Relatedly, it is to be understood that the towing plane or aircraft A can take a wide variety of forms, now known or later developed, depending on numerous of factors, particularly the size and weight of any towed plane or glider G and its launched vehicle L and any payload (not shown) it contains, such that the non-descript aircraft A is merely illustrative. Likewise, the glider G may take a variety of forms, now known or later developed, as configured for being pulled or towed by the aircraft A and temporarily securing a launch vehicle L on or adjacent to the glider G, again depending on the size and characteristics of the launch vehicle L and its payload, such as a satellite to be deployed into orbit around the earth. Such a glider G may be manned or unmanned (remotely controlled) and while not needing or being equipped with independent take-off capability, it may have a sustainer motor to maintain speed and climb to its final altitude for air-launch of the launch vehicle L, more about which is said below. Finally, the launch vehicle L may also take various forms, now known or later developed, but is typically configured as a rocket that may selectively detach from the glider G in flight and so be launched via ignition of its engine. In a typical tow-launch sequence, at take-off the towing vehicle or aircraft A takes off first and stabilizes at about 200 feet before the towed vehicle or glider G takes off, the one or more spoiler O on the wing I of the glider G serving to keep the glider G on the ground until take-off is desired, which spoiler O may also be employed for in-flight control of the glider G (e.g., braking while in tow to maintain desired tow cable tension or climbing or banking once detached from the aircraft A). To accomplish such a low-launch of the aircraft A and then the glider G, typically a runway of on the order of 10,000 feet or longer would be employed. Once the aircraft A and glider G are airborne, the two may climb together to the desired altitude for glider G separation and flight, typically about 35,000-40,000 feet, from which point the sustainer motor (not shown) of the glider G is started and the glider G then flies independent of the aircraft A somewhat vertically to a launch height of approximately 45,000-50,000 feet or more, at which point the launch vehicle L separates from the glider G, its engine is ignited, and so it proceeds through one or more stages to the final orbital elevation, while the glider G having separated from the launch vehicle L returns to earth for possible further flights or service. Once more, those skilled in the art will appreciate that this high level tow-launch summary is merely illustrative and non-limiting.

With continued reference to FIG. 1, it will again be appreciated that key design, construction, assembly, and integration considerations for the safe, sound, and effective use of a tow launch system 20 according to aspects of the present invention involve the elongation and dampening properties of the integrated tow cable 30. Elongation and dampening properties of such a tow cable 30 are affected by cable construction materials, individual cable strand combinations, and cable weaving configurations, for example. As stated previously, elongation properties of the tow cable 30 can introduce catastrophic levels of excessive structural loads into the towing aircraft A and/or towed glider G through exacerbation and/or compounding of oscillation loads, sometimes referred to as the "bungee effect." In applications where there are relatively high resistance loads on the glider G, such as significant drag that ensures the tow cable system 20, and the tow cable 30 specifically, is under substantially constant positive tension, the bungee effect can actually assist in dampening the loads transferred to the towed glider G. Whereas, with such gliders G aerodynamic drag is often not significant enough to ensure tension is maintained in the tow cable system 20 such that oscillations from positive to negative tension loads still occur. Thus, without intervention, these loads will typically increase following each transition from positive to negative tension that ultimately compound to increase loading to levels sufficient to exceed the structural capacity of the aircraft A and/or glider G and related attachment points, thereby again potentially causing catastrophic structural failure. Accordingly, since integration of different cable construction materials, individual cable strand combinations, cable weave configurations, and the introduction of dampening techniques and/or devices affect cable elongation and dampening properties, it is important that these considerations be addressed in a tow cable system according to aspects of the present invention.

Figures 2A, 2B, 2C:
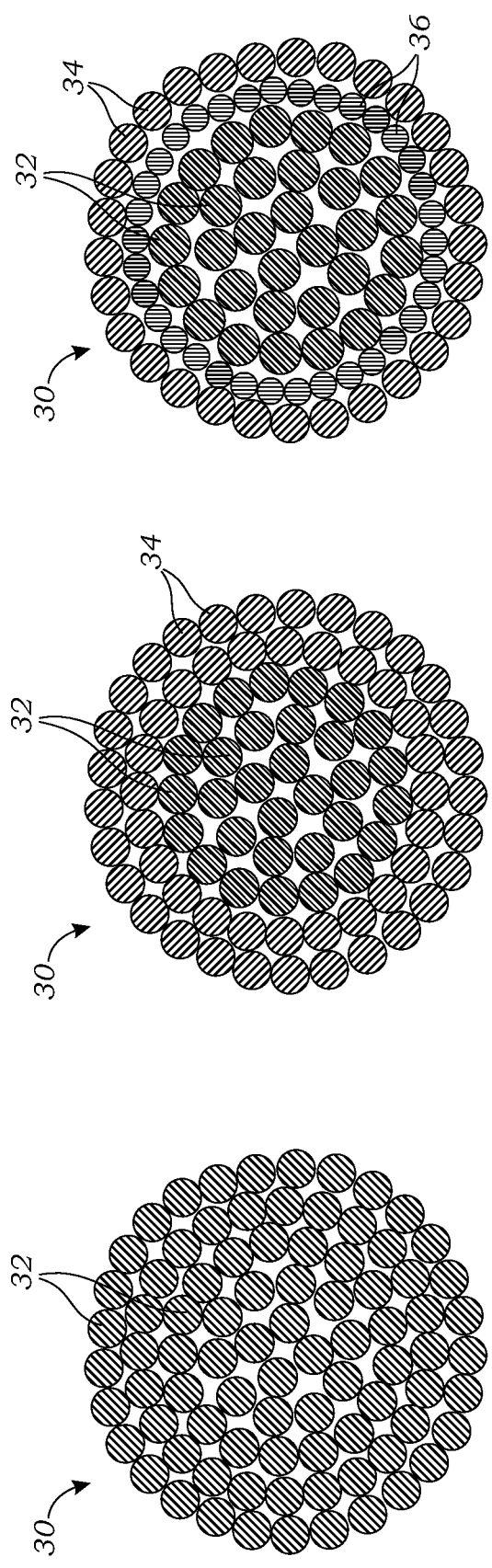
FIG. 2A is an enlarged schematic cross-sectional view of a first exemplary tow cable thereof, in accordance with at least one embodiment.
FIG. 2B is an enlarged schematic cross-sectional view of a second exemplary tow cable thereof, in accordance with at least one embodiment.
FIG. 2C is an enlarged schematic cross-sectional view of a third exemplary tow cable thereof, in accordance with at least one embodiment.

Turning to the enlarged cross-sectional views of FIGS. 2A-2C, there are shown three exemplary tow cable 30 configurations. Any such cable 30 is typically formed of woven or twisted fibers that are made into yarns that are then twisted into threads and eventually braised into ropes or cables, which was traditionally a manual process. Modernly, the most common cable construction approach is now machine-manufactured braided ropes consisting of multiple materials such as an abrasion resistant outer cover over an inner core. There are today still some braided ropes made simply from a single braid, such as in polypropylene, as illustrated in FIG. 2A showing the tow cable 30 as comprising a single kind of fibers 32. Referring to FIG. 2B, the majority of braided ropes or cables 30 again consist of an outer cover of woven second fibers 34 over an inner core of woven first fibers 32 to optimize the material properties of each and thereby meet the specific performance requirements of the cable 30 and overall cable system 20. Finally, with reference to FIG. 2C, in some configurations, three layers are used—a load-bearing core material of woven first fibers 32, an abrasion and UV resistive outer cover of woven second fibers 34 and here an intermediate layer of third fibers 36 selected to resist slippage between the inner core material fibers 32 and the outer cover fibers 34. It will be appreciated that in any such configurations of the tow cable 30, braiding tends to reduce the elongation properties of the cable 30 and cable system 20 over material selection alone. For multi-material cables 30 as illustrated in FIGS. 2B and 2C, the material properties of each material or layer will be reflected in the resulting cable 30. For example, a Vectran™ core or first material 32 with a polypropylene cover or second material 34 will be relatively light and strong, but will have reduced abrasion or UV resistance. By comparison, a polyester cover or second material 34 over the same core fibers 32 will provide relatively better abrasion resistance but at relatively greater weight. The relative thicknesses of the core material 32 versus any cover material 34, in terms of fiber thickness or diameter and/or weave, as also illustrated schematically in FIGS. 2B and 2C, further affects the performance of the finished tow cable 30.

In combination with material selection and configuration, initial pre-loading or pre-tensioning of the tow cable 30 can affect tow cable elongation properties during subsequent cable loading events while in use as shown, for example, in FIG. 1. A key consideration is selection of cable construction materials that have reduced elongation following initial pre-loading or pre-tensioning. For example, selection of the spun liquid crystal polymer fiber, Vectran™, will reduce elongation from approximately 5% prior to pre-loading to less than 2% for subsequent loading events, thereby reducing the band of oscillation loading differential and the potential negative impact of the compounding loading that often results from the bungee effect. Limiting the return of the tow cable 30 to its initial elongation state ultimately assists in dampening oscillation loading transmitted to the towed glider G. Pre-tensioning initiates cable elongation that in most tow cable 30 configurations constructed using more than one material, such as a combination of synthetic fibers and/or metal strands and/or two or more fibrous materials, do not rebound to their original cable length prior to the application of a tensioning force, with such cable pre-tensioning thus resulting in a relatively stiffer cable system 20. Applied to towing of moving bodies, such as the towing of one aircraft by another, this phenomenon can be used to predict, with greater reliability, the spring or oscillation loads that may be induced by the cable 30 into an attachment point or aircraft body. In the exemplary embodiment, pre-tensioning of the tow cable 30 reduces the oscillation loads induced into the towed glider G by the towing aircraft A under positive tow loads. Accordingly, pre-loading or pre-tensioning the tow cable 30 thus is an important parameter of an overall tow cable system 20 according to aspects of the present invention, assisting in stabilizing tow loads and reducing cable system 20 oscillation load amplification. That is, pre-flight pre-loading or pre-tensioning of the tow cable 30 contributes to conditioning the cable 30 for optimal in-flight performance; i.e., to counteract or mitigate the potentially catastrophic "bungee effect."

Referring next to FIGS. 3A and 3B, then, there are shown schematically two exemplary means of pre-loading or pre-tensioning the tow cable 30. First, in FIG. 3A, a tensioner assembly 110 is configured as a geared take-up or tensioner wheel 112 opposite a fixed end of the cable 30. That is, pre-flight or pre-use, the cable 30 may be placed in the exemplary tensioner assembly 110 with one end anchored at a first fixed reference point F1 and the opposite end of the cable 30 connected to the tensioner wheel 112 at a cable connector 118. Both the first fixed reference point F1 and the cable connector 118 may be any temporary but sufficiently strong means of mechanically affixing or securing the cable to such anchor points or objects, now known or later developed. By way of illustration and not limitation, a coupling or grip may be provided to mechanically engage the cable ends similar to that found in tensile test machines and the like or the connector affixed to the cable for later use for engaging the tow cable 30 with the aircraft A and/or glider G may be engaged with appropriate configured receivers at or defining the first fixed reference point F1 and the cable connector 118. The take-up or tensioner wheel 112 on or to which the cable 30 or cable connector 118 is attached may itself be provided with a coaxial wheel gear 114, with the wheel 112 and gear 114 together rotating about a wheel axle 116. A drive gear 120 is provided so as to be in toothed or meshed engagement with the wheel gear 114, the drive gear 120 being mounted on a drive axle 122 and driven by a motor 124. As shown, the entire tensioner assembly 110 is installed at a second fixed reference point F2 an appropriate distance away from the first fixed reference point F1 based on the size or length of the tow cable 30 to be pre-loaded or pre-tensioned. Those skilled in the art will appreciate that either or both of the first and second fixed reference points F1, F2 may be selectively moveable and fixable to effectively set the distance therebetween as desired. It will be further appreciated that the tensioner assembly 110 as configured as shown in FIG. 3A with the tow cable 30 installed between the first and second fixed reference points F1, F2, particularly with the free end of the cable 30 attached or secured to tensioner wheel 112, operation of the motor 124 to turn the drive axle 122 and thus the drive gear 120 clockwise will thus turn the wheel gear 114 and thus the tensioner wheel 112 counterclockwise so as to put the tow cable 30 under tension or load as its end is pulled or begins to wrap somewhat around the tensioner wheel 112—the extent to which the cable 30 is actually taken up depends on a number of factors, including but not limited to the overall length, diameter, and material of the tow cable 30 and the diameter of the tensioner wheel 112. Through gear reduction as shown or as further employed and/or appropriate motor selection, it will be appreciated that a range of torques may be applied to the tensioner wheel 112 and thus tension loads to the cable 30, more about which is said below. Similarly, with reference to the alternative exemplary embodiment tensioner assembly 110 of FIG. 3B, a linear tensioner actuator 132 may instead be provided at the second fixed reference point F2 with the respective end of the cable 30 again being anchored or affixed to the actuator 132 for selective tensioning. As shown, the tensioner actuator 132 may generally comprise a tensioner piston 134 operable within a piston body 136, with the cable connector 138 affixed on the free or exposed end of the piston 134. The cable 30 and/or connector 138 may again be coupled with the piston 134 employing any appropriate means now known or later developed. In the exemplary embodiment the piston body 136 is mounted on the second fixed reference point F2 while the piston 134 is free to move therein. As with the tensioner wheel 112, the mounting of the piston 134 and more generally the distance between the first and second fixed reference points F1, F2 may vary as needed. By way of illustration and not limitation, the tensioner piston 134 may be a hydraulic or pneumatic piston, an electromagnetic actuator, or other such linear actuator, with the amount of force or load it is capable of exerting being scalable according to the configuration and operational characteristics of the tensioner 132. In any such embodiment, it will appreciated that operation of the tensioner actuator 132 so as to shift the piston 134 into or toward the body 136 would thus place the tow cable 30 under tension or load as desired. It will be appreciated more generally that any such tensioner assembly 110 may be a dedicated ground-based installation or may be part of or incorporated in the tow cable manufacturing process.

In any such embodiment of the tensioner assembly 110 and more generally in connection with pre-loading or pre-tensioning any tow cable 30 according to aspects of the present invention, a load greater than the anticipated maximum load under tow that the cable 30 will experience in operation or use will effectively stabilize the tow cable system 20 to reduce amplification of oscillation loads transmitted to the towing body attach point, here the pylon P located at or near the tail T of the aircraft A, or the towed body attach point, here the nose N of the body B of the glider G, by reducing the post-tension elongation properties of the tow cable 30. In particular, aspects of the invention entail stretching the fibers 32, 34, 36 (FIGS. 2A-2C) of the tow cable 30 to a maximum elongation (i.e., to the point where the elastic response of the cable ends). As such, loading ranges based on the properties of the cable 30 and any desired elongation effects will typically be employed, or a tension load greater than zero and up to the maximum elastic/tensile strength of the cable 30 pre-failure. It will be appreciated that temperature and other ambient conditions may also play a role in determining any such loading and the cable 30 response. In an exemplary embodiment, a tensile force or load of on the order of 12,000 pounds is applied to the tow cable 30 to pre-condition it for use. Elongation of the tow cable 30 after pre-loading or pre-tensioning is in an exemplary embodiment no more than approximately 1-2%, such as may be the case with Vectran™, for example. As such, based on a nominal length of the tow cable 30 of approximately 1,000 feet, it will be appreciated that the cable 30 may stretch by up to approximately 10 to 20 feet after pre-tensioning.

Referring once more to FIGS. 2A-2C, it follows from the foregoing that material selection for the tow cable 30 is an important factor in determining pre-loading or facilitating permanent cable elongation as a result of pre-tensioning and/or pre-loading. Selection of a material or combination of materials and related cable construction configurations that meet the specific technical design requirements of the overall tow cable system 20 are thus critical. Specifically, balancing strength, weight, loading response, abrasion resistance, elongation resistance, behavior when exposed to specific environmental conditions, chemical and mechanical interactions, and other such attributes are important variables or considerations in ensuring that the tow cable system 20, and tow cable 30 specifically, minimizes oscillation loading amplification and results in predictable and stable elongation properties. Six materials are typically employed in making ropes or cables for use in a wide variety of applications including towing operations. These fibers can be used alone or in combination to produce tow cables 30 of widely differing properties and price, examples of which again include but are not limited to the configurations represented schematically in FIGS. 2A-2C. Currently, the most common fibers for tow cables and ropes are: (1) aramid; (2) high modulus polyethylene ("HMPE"); (3) nylon; (4) polyester; (5) polypropylene; and (6) liquid crystal polymer ("LCP"). Each such fiber is addressed briefly below. As a threshold matter, it will be appreciated that any such fibers now known or later developed may be employed alone or in combination within a tow cable 30 according to aspects of the present invention without departing from its spirit and scope, with again different cables being configured and selected for different applications.

Aramid fibers are a class of strong, heat-resistant synthetic fibers manufactured and sold under such brands as Kevlar™, Nomex™, Twaron™, Technora™, and others. Such fibers combine high strength, high stiffness, resistivity, and thermal properties that make them an excellent choice for a wide variety of applications. However, disadvantages of aramid fibers include their susceptibility to damage by shock loads, leading to failure with minimal appearance of damage and making it difficult to assess the condition of the material after being subjected to potentially catastrophic shock loads. Nearly twice the strength of polyester with only half of the elongation, aramid fibers are incorporated in applications where weight reduction is important. Their primary use in cable applications has been typically relegated to core materials integrated within other fibrous material configurations as a cover. The susceptibility of aramid fibers to breakage in bending, fatigue, and resulting internal friction from rubbing fibers under repeated bending conditions often limits their application to towing operations.

Plasma™, Spectra™, Dyneema™ and Amsteel™ are exemplary brand names for high modulus polyethylene ("HMPE") fibers typically produced by gel-spinning ultra-high molecular weight polyethylene ("UHMWPE"). HMPE fibers resist degradation from chemical and UV exposure and perform well in harsh environments. Through alignment of molecules in the direction of loading, these fibers have superior strength properties that facilitate their use in towing operations. Molecular alignment is introduced during the chemical and mechanical manufacturing process which produces relatively high strength, yet this process also results in the material continuing to elongate under sustained loading over time. In addition, the material does not return to its original length when unloaded resulting in unpredictable length stability. Still, HMPE is a viable choice for use in towing operations, particularly in combination with other materials with more predictable elongation properties.

Nylon is an early synthetic fiber material with excellent abrasion resistance, ultra-violet light resistivity, and chemical exposure tolerance. Predominantly used in marine contexts, specific applications include dock and anchor lines. For towing applications, nylon is a good choice for abrasion protection, however, other newer fibers have proven even more effective for this use.

As a general purpose fiber, Dacron™, a trade name for DuPont polyester, is an excellent material of choice for single fibrous material applications. Polyester performs well in virtually every technical evaluation category including strength and elongation properties, environment resistivity, and nominal loading conditions. When compared with other material combinations, polyester is typically not the highest performer in any one category, so towing applications are often better supported by multi-fibrous material configurations potentially incorporating polyester.

Polypropylene is a relatively inexpensive, lightweight fibrous material typically used in agricultural bailing and marine applications due to its flotation properties and water absorption resistivity. Polypropylene, however, has several key disadvantages for its application to towing operations including strength limitations, low resistivity to elongation, susceptibility to degradation in sunlight and low heat resistance. The primary advantages lend its use in marine applications requiring large diameter cable with minimal weight. Polypropylene is also used in combination with other materials, for example, as an outer cover for a stronger inner core material to take advantage of its floatation properties, such as to avoid watercraft propeller entanglement. For tow operations, a stronger, abrasion resistant material would be a better choice, particularly for the cable core.

Finally, one of the newer high-strength fibrous materials, Vectran™, is an ideal material to support towing operations. Vectran™ also incorporates molecular alignment through its manufacturing processes as in HMPE fibers, yet resolves the slow continual elongation phenomenon through the use of electric currents to achieve alignment, thereby branding Vectran™ as a naphthalene-based thermotropic liquid crystal polymer ("LOP"). Vectran™ is an exceptionally-strong fibrous material with minimal elongation properties and virtual resistance to continual elongation or creep. Other advantages include superior abrasion resistance and low propensity for sudden failure as in aramid fibers. Due to its low UV light exposure resistance, Vectran™ is preferably used as a core material surrounded by a UV-resistant cover material.

Based on the foregoing, and by way of further illustration and not limitation, when it comes to a tow cable 30 of a single fiber weave as illustrated in FIG. 2A, such may be any of the identified materials, or any other such materials now known or later developed, with polyester, nylon, polypropylene, and even the newer Vectran™ material having generally acceptable properties as to each design criteria for some applications. More likely, though, some multi-fiber weave configured to optimize the properties of each fiber, some having higher strength and some having higher abrasion or UV resistance, for example, will be employed in a tow cable 30 according to aspects of the present invention, such as illustrated in FIGS. 2B and 2C. In a two-fiber configuration as shown in FIG. 2B, once again, the braided rope or cable 30 consists of an inner core of woven first fibers 32 within an outer cover of woven second fibers 34—by way of illustration and not limitation, the inner first fibers 32 may be Vectran™ or an aramid fiber such as Kevlar™, with the outer cover fibers 34 being a weave of HMPE, nylon, polyester, or polypropylene. When a third fiber 36 is employed as a layer between the inner core fibers 32 and the outer cover fibers 34, such may be a highly abrasion resistant material such as nylon or polyester to act as a buffer between the outer and inner layers, each of which may have a tendency to stretch or elongate at different rates under the same loading, whether pre-loading or as in use. Relatedly, incorporation of an elongation-resistant strand material such as Vectran™ or Kevlar™ also acts as a buffer against abrasion by limiting relative elongation of the tow cable 30. Those skilled in the art will appreciate that all such tow cable configurations are exemplary and non-limiting and that a variety of such materials, now known or later developed, in various weaves or configurations may be employed without departing from the spirit and scope of the invention. By way of further example, it will be appreciated that rather than one single fiber at an inner, outer, or intermediate layer as illustrated, multiple fibers may be blended or woven at each discrete layer—that is, the core fibers 32 may be comprised of a weave of multiple fibers rather than all being the same fiber; likewise, the cover fibers 34 may, too, be a blend of multiple fibers. Though one, two, or three discrete layers or fibers 32, 34, 36 are illustrated, those skilled in the art will appreciate that four or more layers may also be employed, again depending on a number of factors. Further, any manufacturing method and means of weaving or braiding now known or later developed may also be employed, including the incorporation of pre-loading or pre-tensioning as noted above. Geometrically, it will be appreciated that the diameters or sizes of individual fibers and of the overall cable 30 or layers within it may vary depending on the application, any such cable 30 being easily scaled up or down to suit a particular context.

Figure 4A:
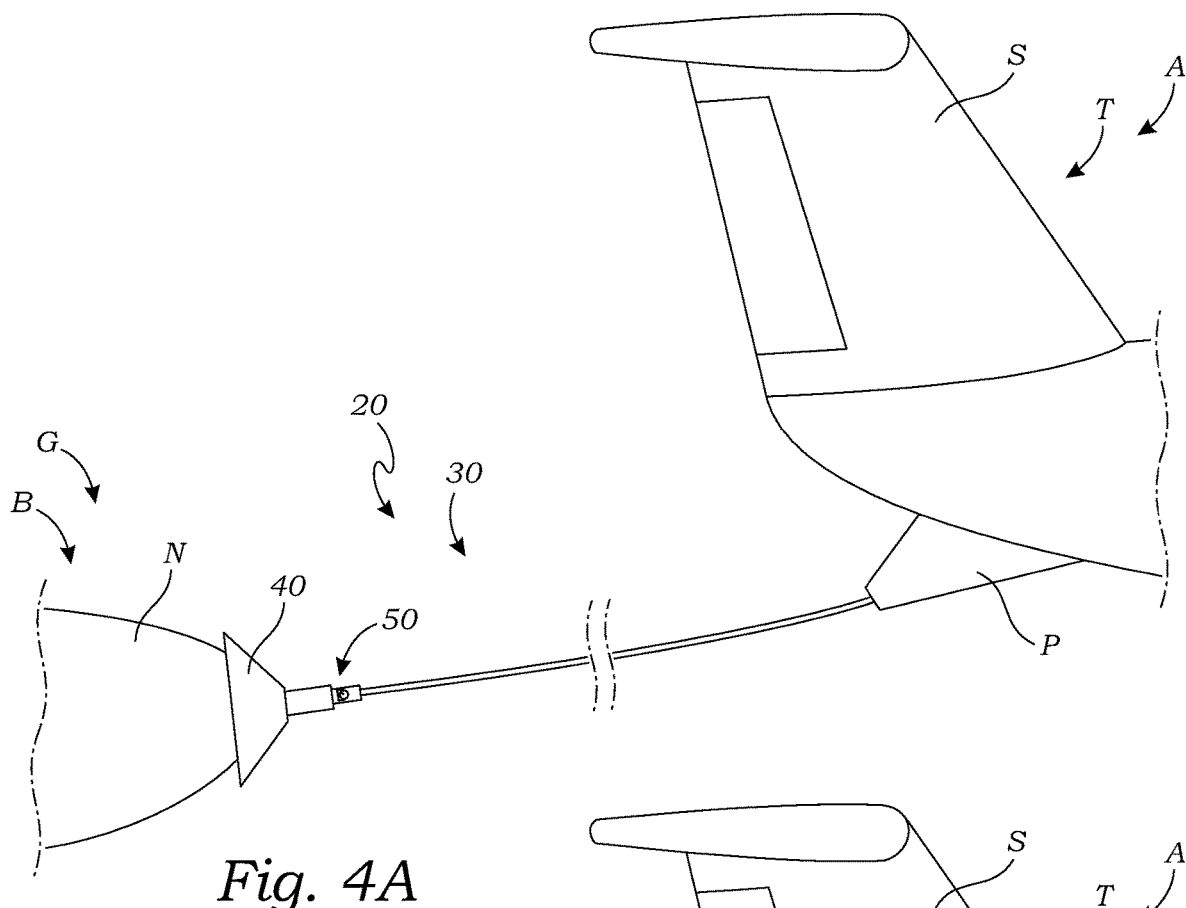
FIG. 4A is a schematic partial side view of a first alternative exemplary tow cable system in use in a tow-launch configuration between an aircraft and a towed glider, in accordance with at least one embodiment.
Figure 4B:
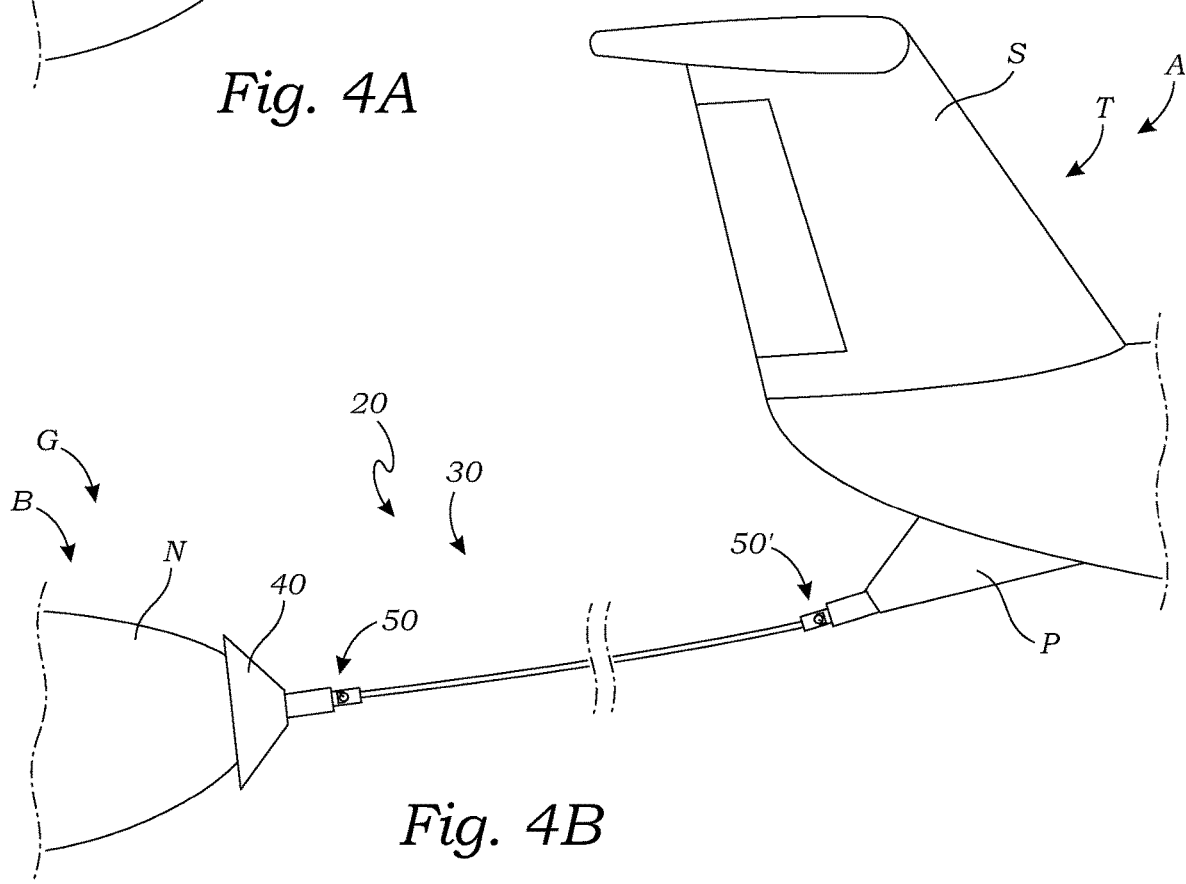
FIG. 4B is a schematic partial side view of a second alternative exemplary tow cable system in use in a tow-launch configuration between an aircraft and a towed glider, in accordance with at least one embodiment.
Figure 4C:
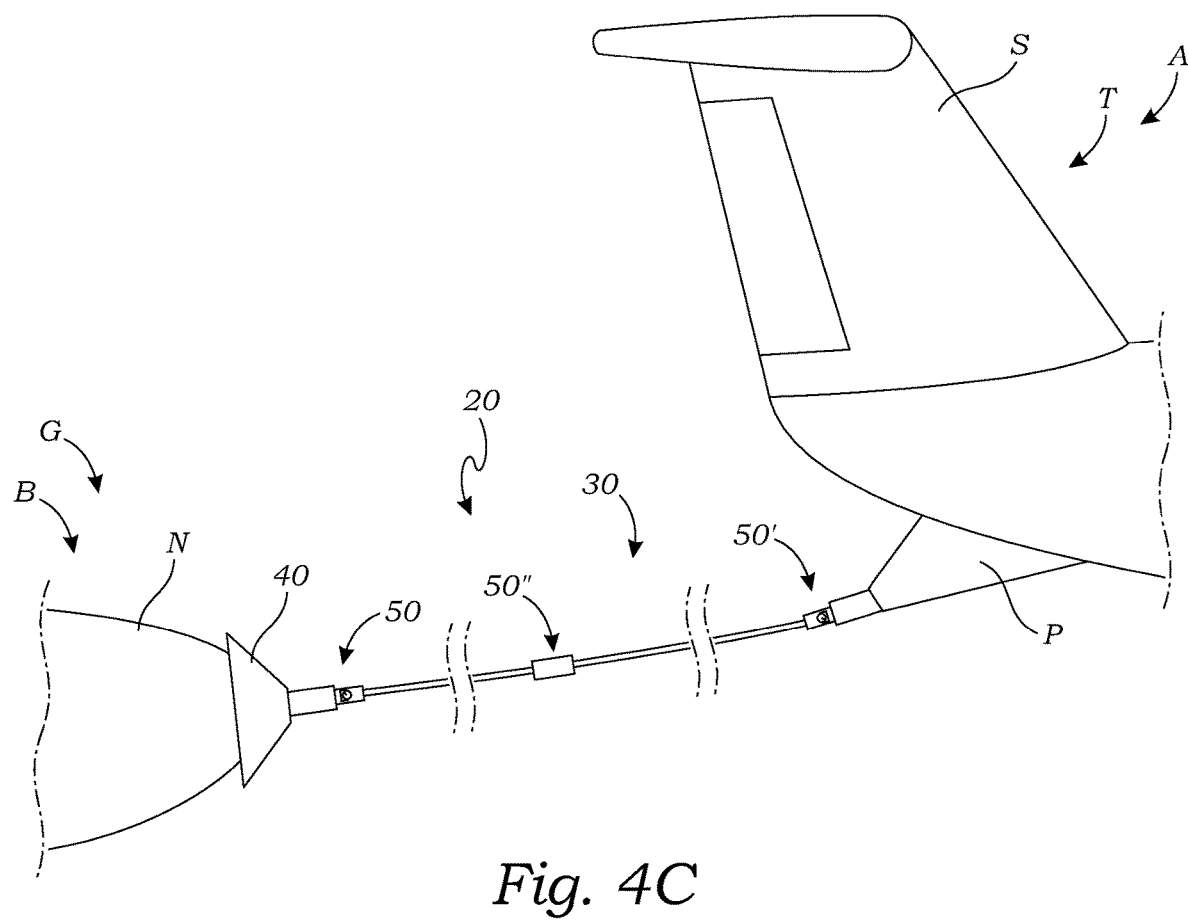
FIG. 4C is a schematic partial side view of a third alternative exemplary tow cable system in use in a tow-launch configuration between an aircraft and a towed glider, in accordance with at least one embodiment.

Turning next to FIGS. 4A-4C, there are shown schematic partial side views of further alternative exemplary tow cable systems 20 in use in a tow-launch configuration between an aircraft A and a towed glider G, essentially incorporating one, two, or three load dampening assemblies 50 in conjunction with the tow cable 30, such as at the connection points to the aircraft A and/or glider G or an intermediate location along the cable 30. At a high level, it will be appreciated that any such load dampening assembly 50 may serve to take up or offset loading variation within the cable 30 so as to minimize or mitigate against such load variation causing the "bungee effect" within the cable 30 and/or excessive loading at the aircraft A or glider G, alone or in combination with pre-loading or pre-tensioning the cable 30 and other factors discussed herein. Each load dampening assembly 50 may be one or more physical/mechanical device such as located at either tow cable attachment point or an intermediate location or may be woven or braided into the tow cable 30 itself, as by providing a section of the cable 30 at either or both ends or at one or more intermediate locations within the cable 30 having different or additional fibers to provide a different elongation or load bearing capacity. It will be appreciated that any such load dampening assembly 50 thus serves as a structural overload safety enhancement device and/or a tow cable attachment point for the towed and/or towing body, designed to reduce and dampen the shock load impact by providing resistance through the use of a spring or other arrangement that extends the shock wave duration in order to extend the shock load over a longer time to reduce structural impact. Shock wave amplification is dampened through the same mechanical response process. The load dampening assembly 50 typically at least serves as the towed glider G tow cable attachment point, but can also be used as the towing body or aircraft A attachment point and/or, again, anywhere along the length of the tow cable 30. First, then, as shown in FIG. 4A, an exemplary tow cable 30 of a tow cable system 20 according to aspects of the present invention is connected between a towing aircraft A and a towed glider G in much the same way as illustrated in FIG. 1. One end of the tow cable 30 is fixed to a pylon P or other such structure at or in the vicinity of the tail T of the aircraft A, which tail T may include a vertical stabilizer S with rudder R for turning or banking the aircraft A during flight in a manner known in the art. The opposite end of the cable 30 is configured with a glider connector 40 shown as being somewhat conical, or having a conical shroud, the benefits of which will be explained in connection with the further discussion below of the system 20 in use as illustrated in FIG. 8. At or adjacent to the connector 40 end of the cable 30, there is installed a first load dampening assembly 50. By comparison, with reference now to FIG. 4B, a first load dampening assembly 50 is again shown as installed at the glider end of the cable 30 and now a second load dampening assembly 50' is shown as installed at the aircraft end of the cable 30, at or adjacent to the structural pylon P. And in FIG. 4C, a tow cable system 20 much like that of FIG. 4B is shown having load dampening assemblies 50, 50' at both the glider and aircraft connection points, now further having a third load dampening assembly 50" at an intermediate location along the cable 30. Those skilled in the art will appreciate that each load dampening assembly 50, 50', 50" may be the same or different relative to any other such load dampening assembly 50, 50', 50" in the system 20. That is, while in FIG. 4C the load dampening assemblies 50, 50' at the glider and aircraft connection points are illustrated one way and the intermediate load dampening assembly 50" another way, all three such assemblies 50, 50', 50" may be the same or different in any appropriate combination to suit a particular context or commercial application. Moreover, it will be appreciated that if only one load dampening assembly 50 is employed, rather than at the glider G as illustrated in FIG. 4A, it may instead be at the aircraft A or at an intermediate location. Similarly, as compared with the two-assembly illustration of FIG. 4B, rather than having load dampening assemblies 50, 50' at opposite ends of the cable 30, such may be at one end and an intermediate location (e.g., at the glider and one or more intermediate locations or at the aircraft and one or more intermediate locations). More than one load dampening assembly 50 may be employed at a single location, and again, more than one such assembly 50 may be provided within the cable at one or more intermediate locations. Once again, any such load dampening assembly 50 of whatever configuration or location within the tow cable system 20 is configured to absorb fluctuations in load rather than, or at least to a lesser extent by, the tow cable 30 and the fuselage or structure of either the aircraft A or the glider G and so provide another separate solution to the "bungee effect." Those skilled in the art will further appreciate that when it comes to connecting the tow cable 30 to either the aircraft A or the glider G, directly or here particularly through a load dampening assembly 50, it is desired that the angle of the cable 30 be properly set or allowed for, as by angling the load dampening assembly 50 at a desired orientation relative to the underlying structure of the aircraft A or glider G or by making the connection of the load dampening assembly 50, directly or indirectly, articulating, as by having a flexible point or linkage, such as a pivot or universal or ball joint to ensure axial tension substantially always along the cable 30, more about which is said below in connection with the specific exemplary embodiments of various load dampening assemblies 50 as illustrated in FIGS. 6A-6B and 7A-7C.

Figure 5:
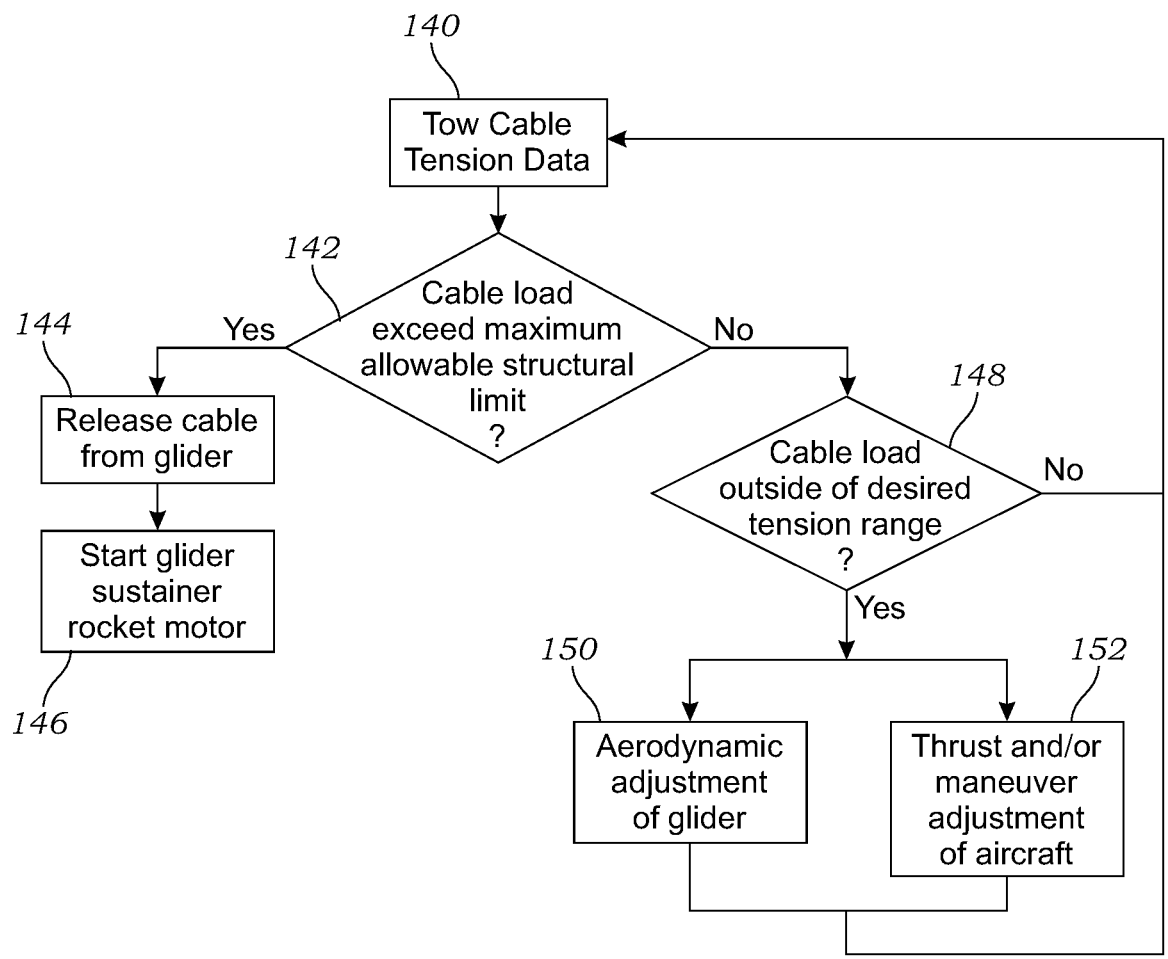
FIG. 5 is a block diagram representation of operation of an exemplary tow cable system, in accordance with at least one embodiment.

With reference again to FIG. 1 and also now to the block diagram of FIG. 5 illustrating operation of an exemplary tow cable system 20 according to aspects of the present invention, maintaining in-flight positive tension or loading on the tow cable 30 substantially at all times is another means to counteract or mitigate against "bungee effect." To maintain positive tension in the cable 30, the towed body or glider G may exercise its aerodynamic properties to create and/or reduce drag and/or the towing body or aircraft A may accelerate or maneuver in order to ensure optimal cable loading. In essence, the idea is to maintain or control relative aircraft speeds as through differential speed control and/or angle of attack. This can be performed through several means, again including: the deployment or retraction of aerodynamic surfaces from the glider G to increase drag; increasing or reducing the angle of attack of the glider G in relation to the aircraft A; and/or the addition of ballast to create additional weight for the glider G. The intent is to minimize the occurrence of repeated cable tension-to-cable slack transitions during towed flight. The unpredictable nature of climatic conditions, air turbulence, thermal transitions, wind gusts, and other natural phenomenon can cause these transitions to occur, yet aerodynamic influences, towed body physical characteristics, and/or flight control maneuvers can be applied to reduce loading effects and oscillation to optimize cable tension loads and reduce or prevent the "bungee effect" within the tow cable 30. Accordingly, one or more of these inputs can be employed to keep the cable 30 in tension, or under a loading of greater than zero and less than the maximum structural load capacity or the elastic/tensile strength of the cable 30 pre-failure. Again, one means of achieving this is to provide the glider G with one or more aerodynamic features that may be selectively employed to increase drag and effective "brake" the glider G in flight and thereby maintain or increase tension on the tow cable 30 as by maintaining the necessary relative speed and/or flight path of the aircraft A and glider G. As shown schematically in FIG. 1, for example, a spoiler O may be provided on the trailing edge of each wing I of the glider G, which it will be appreciated when lowered or extended or otherwise deployed would provide a disruption to the airflow over or under the wing and increase drag. Those skilled in the art will appreciate that a variety of such aerodynamic effects, now known or later developed, may be employed, and whether manually or remotely or automatically, depending in part on whether the glider G is manned or unmanned, either of which being possible. Again, the aircraft A may also influence tension on the tow cable 30 through its in-flight operation and maneuvering. For example, the aircraft A can apply acceleration maneuvers and/or thrust control measures to modify tension loads applied to the cable 30. Altitude climb or decent maneuvers by the aircraft A can be applied to decrease and/or increase acceleration, respectively. It will be appreciated that in the schematic of FIG. 1 both the aircraft A and the glider G have "levelled off" with the glider G typically or preferably positioned behind and somewhat beneath the aircraft A, through again it will be appreciated that maneuvers may be made by either vehicle to keep tension on the cable 30 and potentially at least temporarily shift their relative positions. Fundamentally, a combination of increased or decreased thrust and altitude climb or decent can be employed to adjust tow cable 30 tension loads. Depending upon the relative altitude separation between the aircraft A and glider G, cable tension loading will vary for a given altitude maneuver and/or thrust control measure applied. For example, in a "low-tow" configuration as shown in FIG. 1, where the glider G is at a lower altitude than the aircraft A, an altitude climb maneuver by the aircraft A while maintaining constant thrust will typically increase the tension on the tow cable 30. Conducting an altitude decent maneuver under these same conditions will typically reduce tow cable 30 tension loads, at least until the relationship between the aircraft or cable connection points moves beyond mid-plane. Increasing or decreasing thrust in combination with altitude adjustments will further increase or decrease tow cable 30 tension loads. For example, conducting an altitude climb maneuver by the aircraft A in a low-tow configuration coupled with an increase in thrust will typically increase the tension on the tow cable 30 greater than performing an altitude climb maneuver alone. Conversely, conducting an altitude decent maneuver by the aircraft A under these same conditions coupled with a decrease in thrust will typically decrease the tension on the tow cable 30 greater than performing an altitude decent maneuver alone, while descending while increasing thrust could still maintain tension loading in the cable 30. In a "high-tow" configuration where the glider G is at a higher altitude than the aircraft A, the opposite effect will typically result from conducting these same altitude maneuvers and/or thrust adjustments. Again, the idea is to employ such aerodynamic and flight maneuver aspects in an effort to maintain tension or positive loading on the tow cable 30 substantially at all times. It will be appreciated that maintenance of the elongation properties of the cable 30 as above-described in connection with pre-loading or pre-tensioning the cable 30 and thereby allowing for some degree of controlled stretch effectively induces higher load and keeps tension on the cable 30, alone or in combination with other such in-flight tensioning techniques as described, the result being to effectively take out any slack in the tow cable 30.

Referring still to FIG. 5, it will be appreciated that a number of the in-flight variables related to absolute and relative speeds and positions of the aircraft A and the glider G and the tension at any given time in the tow cable 30 can be monitored and accounted for, whether manually, semi-automatically or automatically or autonomously, as through "instrumenting" the system 20 and thereby effectively creating a control loop. Speed and altitude data for both the aircraft A and the glider G may be obtained and communicated using any appropriate technology, now known or later developed, and then acted upon. Tow cable 30 tension loads are typically measured through the use of accelerometers and/or strain gauges attached to and/or contained within the tow cable system 20, such as within the tow cable 30 itself or any attachment or connection point, including but not limited to any load dampening assembly 50 employed, which aircraft and tow cable data will determine appropriate altitude and/or thrust adjustment response and magnitude for either or both of the aircraft A and glider G. Collectively, there are thus contemplated systems and methods—manual processes or automated (algorithmic/instrumented) processes—for maintaining tension in the tow cable 30 or relative aircraft speed as needed. Such data may again be employed automatically or autonomously and/or be displayed on a cockpit display of the aircraft A and/or glider G. Inherent in having such data available, particularly as to substantially real-time data on the tow cable 30 tension or loading, are related safety or "abort" mechanisms for such a tow cable system 20 according to aspects of the present invention, such as automated release of the tow cable 30 from the glider G when loading in the cable 30 exceeds its own nominal failure threshold or that of the structure of either the aircraft A or the glider G, more about which is said below in connection with FIG. 8. Referring still to FIG. 5, then, at step 140 of any such "control loop" related to tow cable 30 tension, such tow cable tension data is gathered, again whether through gauges or instruments now known or later developed and reported automatically or otherwise. At step 142 the measured value of cable tension load is compared against an allowable structural limit, which may be set pre-flight based on the properties of the tow cable system 20, including both the tow cable 30 and any attachment hardware or load dampening assembly 50 in the system 20, and of the aircraft A and glider G and/or set or adjusted during flight based on other factors such as reduced payload, ambient conditions such as temperature, etc., any of which may also be instrumented. If it determined that the tension or loading has exceeded the maximum allowable structural limit, then the tow cable 30 may immediately be released from the glider G in what would effectively be an "abort," as indicated at step 144. Accordingly, the released glider G, again whether manned or unmanned, would as indicated at step 146 have its sustainer rocket motor (not shown) ignited and the glider G then flown or returned back to earth. Whereas if at step 142 it is determined that the cable tension loading has not exceeded the maximum allowable structural limit, a subsequent inquiry as part of the control loop as indicated at step 148 might be whether the cable tension loading, even if not over the maximum allowable, is yet outside of a desired operating range. If "no," then the "loop" returns to step 140 to acquire further "real-time" cable loading data, while if "yes," at step 150 an aerodynamic adjustment of the glider G may be made and/or at step 152 a thrust and/or maneuver adjustment of the aircraft A may be made, either way to increase or decrease tension on the tow cable 30 as needed. Relatedly, while the adjustments at steps 150 and 152 are shown in parallel and as both following an affirmative conclusion from step 148 regarding tow cable 30 tension being outside of the desired range, it will be appreciated that one but not both of such "corrective action" may be taken and/or that such actions may be taken in series rather than in parallel, though with the feedback loop being substantially continuous, such timing issues become a bit irrelevant. But by way of further illustration, a first response to a low cable tension reading, indicating that slack could begin to develop in the cable 30, might be adjustment of the aerodynamic effects of the glider G alone as at step 150, with further out of range data readings then resulting in simultaneously increasing thrust or climb of the aircraft A (assuming a "low-tow" configuration), or potentially adjusting the thrust or maneuvering of the aircraft A instead of further implementation of aerodynamic effects in the glider G. Alternatively, adjustments to the aircraft A as at step 152 may be made first and the aerodynamic effects of the glider G implemented as at step 150 only as needed. Those skilled in the art will appreciate that such in-flight adjustments are complex and interdependent, which is all the more reason that the tow cable 30 tension data be substantially continuous or "real-time" and/or system responses to it be somewhat automatic or autonomous, as in algorithmic. Relatedly, it will be appreciated that the more "out of range" any tow cable 30 tension reading is the more "extreme" or immediate any response might be in order to prevent undesired or catastrophic effects. In principle, by substantially continuously monitoring and responding to tow cable 30 tension, typically only slight "in flight" adjustments would be needed to maintain such tension or loading within a desired range for the particular application, and tow cable system 20 and tow cable 30 specifically, absent some unexpected failure within the system, such as a power loss by the aircraft A, or unexpected outside influence, such as a drastic wind shear. From there, at steps 150 and/or 152, the "loop" again returns to step 140 of acquiring further tow cable 30 tension data, and so on. Those skilled in the art will appreciate that this procedure may repeat indefinitely and so provide substantially continuous or "real-time" tow cable 30 tension monitoring as desired. It will be further appreciated that the basic "control loop" methodology of FIG. 5 is greatly simplified and may involve a variety of additional or different steps and related hardware or software, now known or later developed, such that the illustrated diagram is to be understood as merely exemplary and non-limiting of features and aspects of the present invention.

Figure 6A:
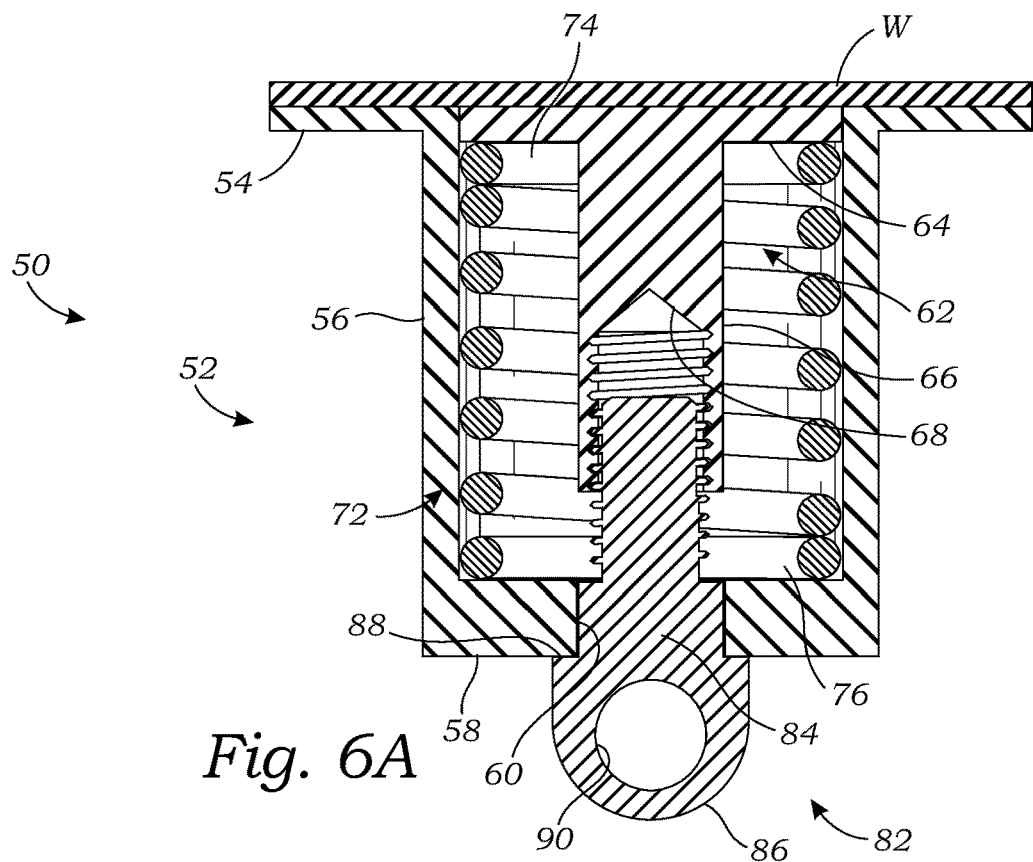
FIG. 6A is an enlarged schematic cross-sectional view of a first exemplary load dampening assembly thereof in a first operational mode, in accordance with at least one embodiment.
Figure 6B:
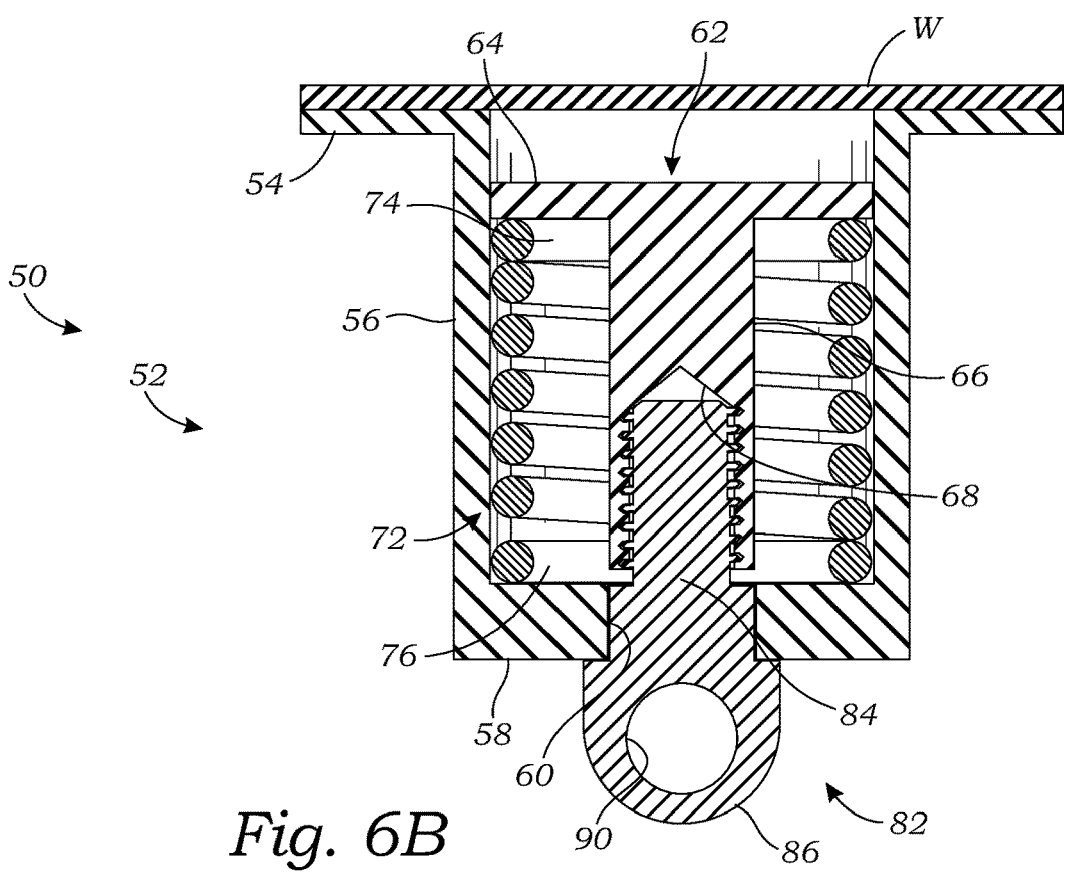
FIG. 6B is a schematic cross-sectional view thereof in a second operational mode, in accordance with at least one embodiment.

Turning next to FIGS. 6A and 6B, there is shown an exemplary mechanical load dampening assembly 50 according to aspects of the present invention in illustrative first and second operational modes as might be employed within an exemplary overall tow cable system 20 such as shown and described in connection with FIGS. 1-5. In general, the load dampening assembly 50 comprises a housing 52 within which is operably installed a tension rod 62 and spring 72, with a cable connector 82 then engaged with the tension rod 62 for the attachment of the tow cable 30 (FIGS. 1-4C). As a threshold matter, it will be appreciated that while a mechanical coil spring 72 is depicted, other "springs" of various kinds, now known or later developed, including hydraulic, pneumatic, or electromagnetic, may be employed instead of or in addition to any such coil spring 72, or any combination thereof. It will again also be appreciated that such drawings are schematic in nature and so are not to be taken literally or to scale regarding the absolute or relative sizes of the components, wall thicknesses, etc. As shown, the spring 72 is configured to operate within the assembly housing 72 as by having its end coil 76 seat against an end wall 58 of the housing 52 and its opposite base coil 74 seat against the base 64 of the tension rod 62 slidably arranged within the housing 52. Both the tension rod 62 and the spring 72 are effectively constrained laterally within the housing 52 by its outer side wall 56, such that the movement of both is substantially axial, or along the lengthwise axis of the housing 52. The cable connector 82 is formed having a body 84 with a distal threaded end configured to be received or engaged within a corresponding threaded hole 68 within the proximal end of the tension rod 62, the body 84 further having an unthreaded boss portion sized and configured to pass through an opening 60 formed in the end wall 58 of the housing 52, which it will be appreciated further maintains the axial alignment and movement of the tension rod 62 within the housing 52. Those skilled in the art will appreciate that the cable connector 82 may be joined with the tension rod 62 employing any appropriate means now known or later developed, such that the threaded engagement is to be understood as merely illustrative and non-limiting. In an alternate embodiment, the tension rod 62 and cable connector 82 may be integral or unitary. As shown in FIG. 6A, the load dampening assembly 50 is in a nominal first operational mode with the base 64 of the tension rod 62 aligned with the base or flange 54 of the housing 52 or flush with the wall W on which the assembly 50 is mounted, as by bolting, riveting, welding, or otherwise fastening, employing any means now known or later developed, the assembly 50, and particularly the housing 52, and more particularly here the housing flange 54, to the wall W or other support structure. Such operational mode is shown as being achieved here by not fully engaging the cable connector 82 within the tension rod 62, or more particularly not threading the cable connector body 84 fully into the hole 68 of the tension rod 62, or essentially engaging the tension rod 62 by the cable connector 82 to the point where the distally-facing shoulder 88 formed between its head 86 and body 84 seats on the housing end wall 58 while again the tension rod base 64 is substantially aligned with the housing flange 54 or bottomed in the housing 52. In this first operational mode, it will be appreciated that the coil spring 72 is at its maximum extension for the assembly 50 (i.e., its maximum length within the housing 52 as by having its base coil 74 seated against the tension rod base 64 and its end coil 76 seated against the housing end wall 58, whether or not the spring 72 is pre-loaded or under compression in its extended state as shown in FIG. 6A). It will be appreciated that the load dampening assembly 50 as configured in such first operational mode is thus able to maximize travel in one direction, as to take up or offset increasing tension in a tow cable 30 attached to the cable connector 82 up to the spring's nominal maximum force for the available displacement. By way of example, if the spring 72 has a nominal spring rate of 10,000 pounds per inch of travel (spring rate being the applied force divided by the distance traveled or per unit of travel), and assuming for simplicity that the spring 72 in the first operational mode as shown in FIG. 6A is at its "free length" and thus under no pre-loading, it can travel one inch before it reaches its compressed length and so any load or cable tension from zero to 10,000 pounds would be dampened or offset by such spring 72 in the first operational mode, while loading beyond 10,000 pounds in this example would not be dampened. Put another way, if the tension in the tow cable 30 dropped to 5,000 pounds, for example, spring 72 would be effectively displaced a half inch and would still be able to dampen any loading fluctuating above or below 5,000 pounds. By comparison, and referring now to FIG. 6B illustrating an exemplary second operational mode of the exemplary load dampening assembly 50, here the cable connector 82 may be further engaged with the tension rod 62 as by threading the cable connector body 84 further into the hole 68 formed in the tension rod post 66—because the distally-facing shoulder 88 of the cable connector 82 seats on the housing end wall 58 and so is fixed spatially, the increased engagement with the tension rod 62 pulls the tension rod 62 proximally against the compression spring 72, thereby spacing the tension rod base 64 from the housing flange 54 and any structure or wall W on which the assembly 50 is installed and effectively pre-loading the spring 72 or placing it under further compression than it is nominally, if any. Those skilled in the art will thus appreciate that the length over which the spring 72 can operate under a given load is reduced; that is, a proportionately higher load is required for further spring displacement, depending on a number of factors. Accordingly, only relatively higher loading may be dampened by the assembly 50 due to the reduced range of travel of the spring 72. Taking the 10,000 pounds-per-inch spring force example again and assuming pre-loading to 5,000 pounds as by shifting the tension rod 62 a half inch proximally, which also assumes a linear spring rate, a load greater than 5,000 pounds must be applied to the assembly 50 as configured in such second operational mode for there to be any spring displacement and thus load dampening, with loading or tension of 5,000 pounds or less being counteracted by the spring pre-load and not being dampened. In either case, it will be appreciated that such spring 72, whether pre-loaded or not, is capable of exerting an equal-and-opposite force to that found in the tow cable 30, within particular ranges, but otherwise does not exert a force on the tow cable 30 independently. As such, in all such load dampening assemblies 50 of any arrangement or configuration, only other effects within the system 20, such as by adjusting the aerodynamic effects of the glider G or the thrust or maneuvering of the aircraft A, work to increase tension in the tow cable 30 as above-described particularly in connection with FIG. 5. Where the load dampening assembly 50 is pre-loaded, it will be appreciated that dampening load initiation is effectively controlled or adjusted. Such tension rod 62 or spring 72 adjustment is determined by calculating the maximum allowable differential tension load between the glider G and the aircraft A, frequency of oscillation loading, elongation properties of the tow cable 30, and/or the dampening characteristics of the spring 72. It will thus be appreciated that such spring set-up or pre-loading may be determined and set pre-flight or during flight based on data acquired from load sensors and the like. Any such adjustment of the spring 72 may thus be manual or automated, the latter as by a servo motor or the like. Accordingly, data from or relating to the spring setting may also be incorporated in any control loop relating to the tow cable 30 and the tension or loading it is under at any given time, the dampening characteristics of the cable's one or more attachment points being understood to further impact the overall performance of the tow cable system 20, with all such configurations and variables being to some extent interrelated. More generally, those skilled in the art will again appreciate that all such arrangements and exemplary forces and nominal spring rates are merely illustrative and non-limiting—particularly, the 10,000 pound loading is a "round numbers" example only and nothing about the actual or expected tow cable 30 loading is to be assumed or inferred thereby. Once more, while a compression spring 72 is shown and described as being operably installed within the load dampening housing 52, those skilled in the art will appreciate that any other such dampening means now known or later developed may be employed according to aspects of the present invention without departing from its spirit and scope. In the exemplary embodiment of a mechanical or coil spring, various spring sizes and rates, whether fixed or adjustable, and related variance in the size of the assembly 50 are possible to suit particular applications and may be scaled up or down as needed. In any case, the desired dampening effect may be achieved without necessarily significant physical travel of the tension rod 62 and spring 72. In an exemplary embodiment, the load dampening assembly 50 or housing 52 is nominally approximately six inches in diameter, with the tension rod 62 having an approximately half inch to two inch travel, though again it will be appreciated that a wide range of configurations and sizes may be employed. And even if there is relatively high elongation of the tow cable 30 during flight or loading, so long as subsequent elongation reduction is controlled (slowed), as through load dampening as described herein and more generally through a control loop approach wherein loading characteristics are monitored and aerodynamic or fight effects adjusted accordingly, overall loading of the cable 30 can remain positive and any "bungee" or "snap-back" effect can be avoided or minimized.

With continued reference to FIGS. 6A and 6B, the tension rod 62, whether a separate component as shown or as incorporated or integral with the cable connector 82, may be configured to serve as a "frangible link" or a further "abortive" or "fail-safe" within a tow cable system 20 according to aspects of the present invention. That is, the tension rod 62 may be configured as based on its material and cross-sectional area and other factors to fail or rupture at a particular tension load much like a tensile test specimen, thereby structurally decoupling the tow cable 30 in the event that tension loading exceeds the maximum allowable induced loading. When serving as a frangible link, the tow cable attachment tension rod 62 may thus be machined to fail at a defined tension load sufficiently less than the established allowable load limit for the towed and/or towing body (glider G or aircraft A). Should the defined tension load be exceeded, the tow cable attachment tension rod 62 would fracture to subsequently separate the tow cable 30 from the towed and/or towing body. In an exemplary embodiment, such load dampening assembly 50 with frangible link tension rod 62 is only at the glider G attachment point so as to preferably release the cable 30 from the glider G and have it dangle from the aircraft A just as in a non-aborted or planned release of the glider G (FIG. 8). As explained herein, the tension rod 62, whether or not configured as a frangible link, may be instrumented, meaning that data about its loading and other parameters can be obtained and acted upon, again whether manually or automatically.

Figure 7A:
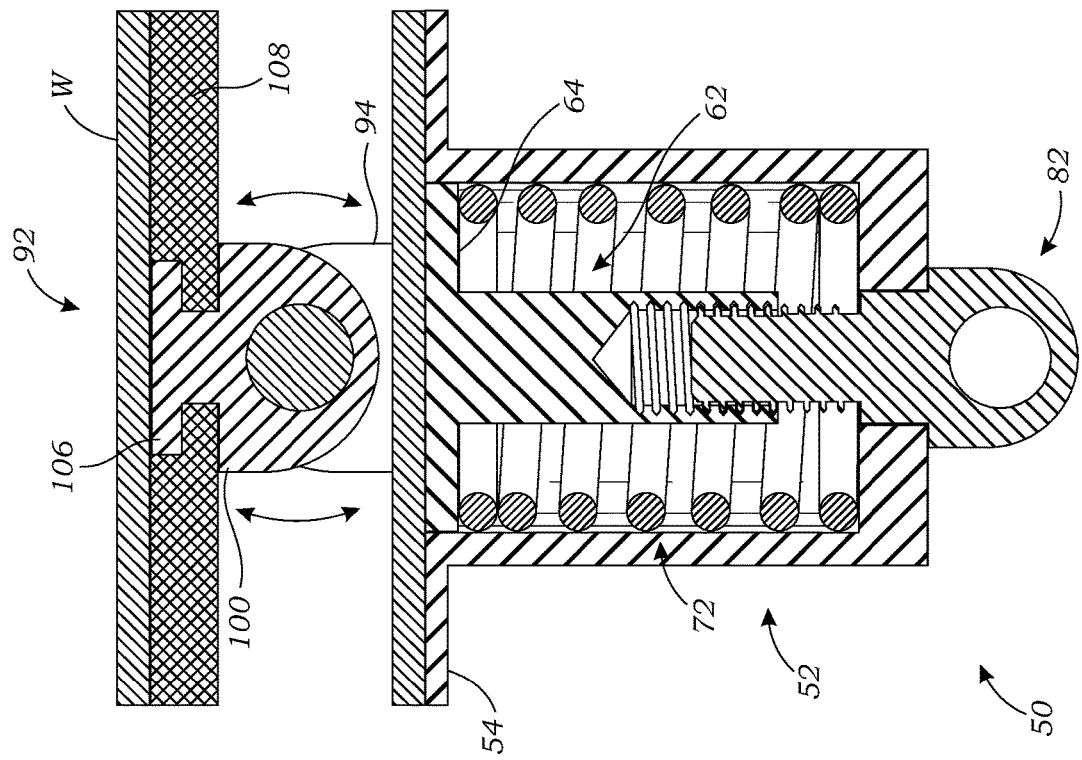
FIG. 7A is an enlarged schematic cross-sectional view of a second exemplary load dampening assembly thereof, in accordance with at least one embodiment.
Figure 7B:
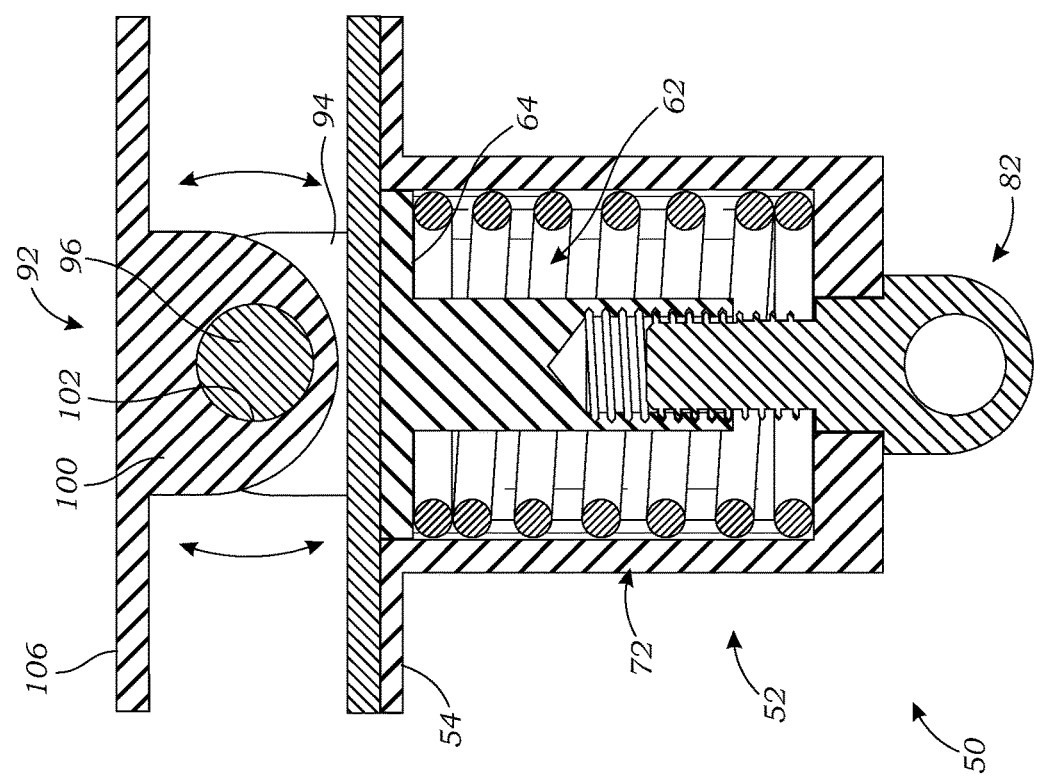
FIG. 7B is an enlarged schematic cross-sectional view of a third exemplary load dampening assembly thereof, in accordance with at least one embodiment.
Figure 7C:
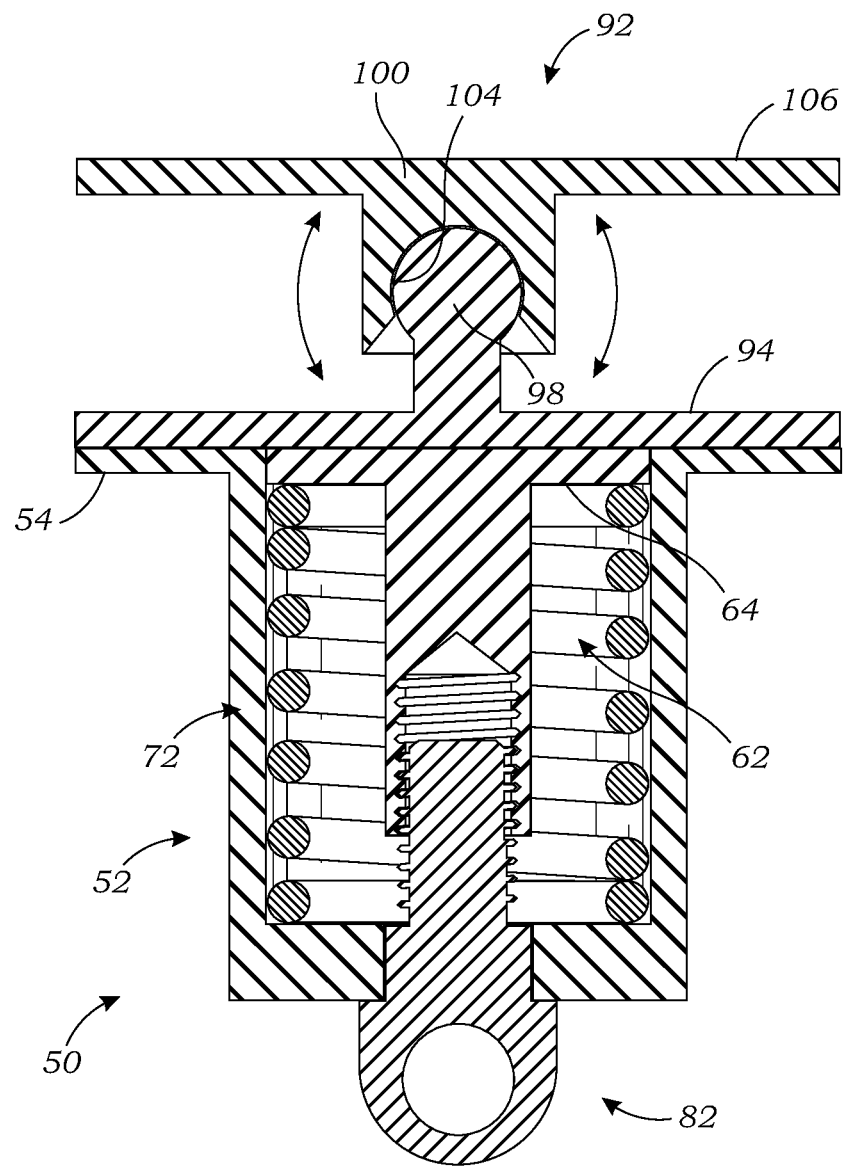
FIG. 7C is an enlarged schematic cross-sectional view of a fourth exemplary load dampening assembly thereof, in accordance with at least one embodiment.
Figure 8:
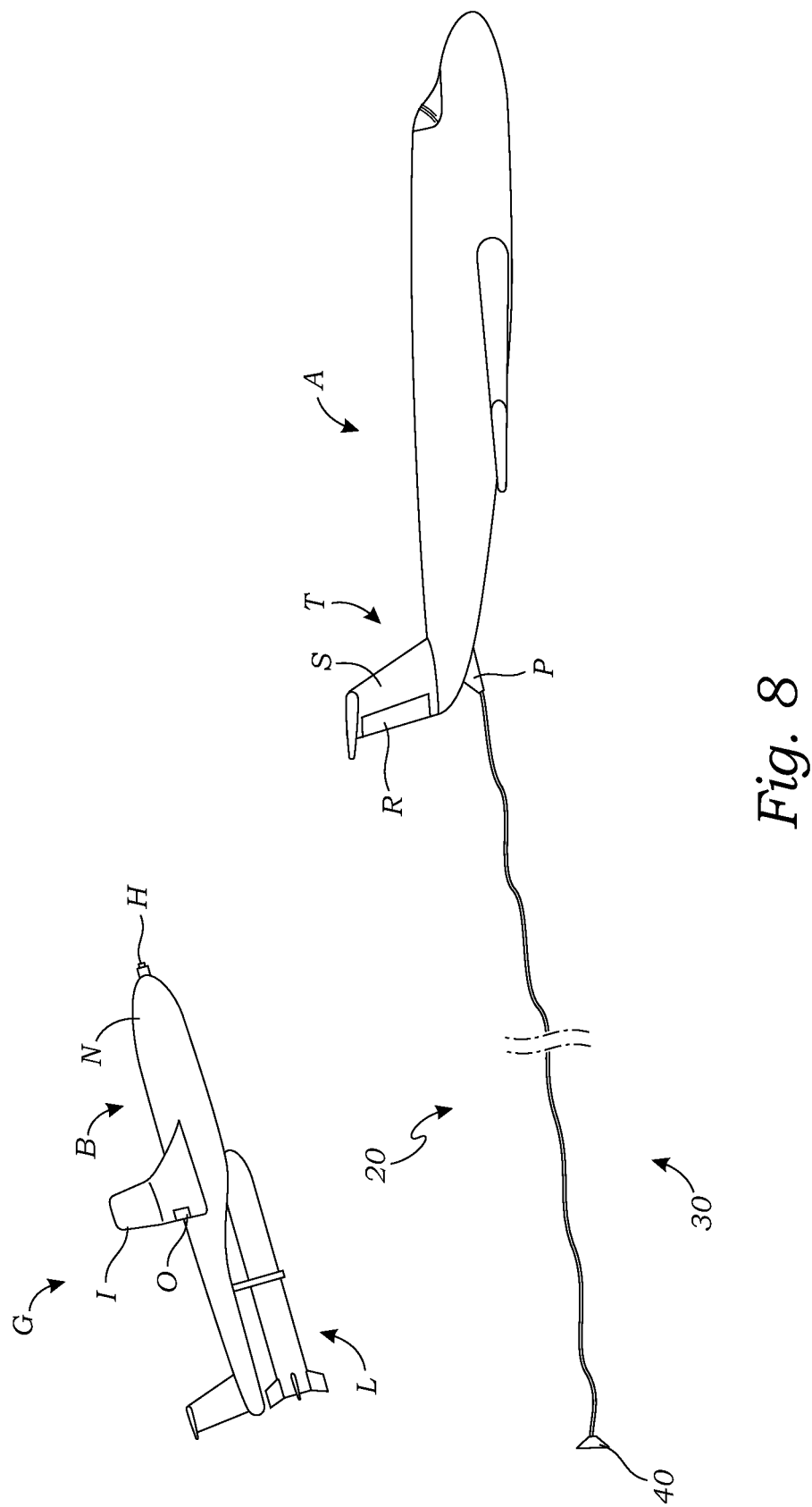
FIG. 8 is a schematic side view of an exemplary tow cable system after use in a tow-launch configuration from an aircraft with the towed glider carrying a launch vehicle disconnected, in accordance with at least one embodiment.

Referring now to FIGS. 7A-7C, there are shown schematic cross-sectional views of three further exemplary embodiments of a load dampening assembly 50 according to aspects of the present invention, here generally constructed as shown and described in FIGS. 6A and 6B as spring device itself, but now illustrating various means of having the assembly 50 be pivotable or articulatable in one or more direction. Generally, it may be preferable to form the tow cable 30 attachment point on either or both the towing aircraft A and the towed glider G as a flexible point or linkage allowing the assembly to "follow" the line of the tow cable 30 essentially no matter the spatial relationship or orientation of the glider G relative to the aircraft A. It will be appreciated that a range of mechanical assembly means, now known or later developed, may be employed in achieving the desired functionality, three of which are illustrated. In the first two exemplary mounting arrangements, as shown in FIGS. 7A and 7B, the load dampening assembly 50 is further configured with a swivel mount 92 that allows pivoting of the assembly 50 in a single plane effectively about a fixed axis, here defined by a pin 96 that pivotally interconnects a first swivel member 94 that is mounted or affixed to the housing 52 as by its flange 54 and a second swivel member 100 that is mounted on the aircraft A or glider G structure. In the exemplary embodiments, the pin 96 is installed in the first swivel member 94 about which the second swivel member 100 pivots as by installing the pin 96 within a cross-hole 102 formed therein, though it will be appreciated that the pin 96 could instead be integral with the second swivel member 100 or simply independent of both swivel members 94, 100. Once more, numerous other mechanical arrangements beyond those shown and described are possible according to aspects of the present invention. By way of further illustration, as shown in FIG. 7A, the second swivel member 100 may be formed having a flange 106 by which the swivel mount 92 is then installed to an underlying structure (not shown). Whereas in the alternative embodiment of FIG. 7B, the second swivel member 100 is formed having a relatively smaller flange 106 that is received or secured within a mounting plate 108, which plate 108 is in turn installed on the underlying fuselage wall W. Turning to the further exemplary embodiment of FIG. 7C, here the first swivel member 94 of the swivel mount 92 is formed having a ball 98 configured for receipt in a socket 104 formed in the second swivel member 100, which ball-and-socket arrangement it will be appreciated enables the swivel mount 92 to articulate in multiple planes or effectively more universally so as to allow a substantially straight-line relationship between the aircraft A and glider G attachment points along the axis of the tow cable 30 even as the relative elevations or orientations between the bodies change, including climbing, descending, or banking by the aircraft A. Accordingly, it will be appreciated that by effectively mounting the load dampening assembly 50 or housing 52 on a "universal joint" or "ball joint" it may be ensured that the tension rod 62 is substantially always in-line or coaxial with the tow cable 30. Such "following" of the tow cable 30 and its angle or inclination relative to any aircraft may be simply mechanically governed as by the forces at work and their vectors or may be instrumented as through position sensors or the like and thus automatically or electromechanically adjusted. Relatedly, the locations of any attachment points on the aircraft A or glider G also would have a bearing on such tow cable 30 angle considerations, with in one exemplary embodiment a nominal line through any such attachment points based on the expected in-flight positioning of the glider G relative to the aircraft A (e.g., "low-tow" versus "high-tow") being such that it would intersect the center of gravity or three-axis geometrical center of each such towing or towed body.

Referring again to FIG. 1 and now in further view of FIG. 8, to ensure maximum structural loading is not exceeded during towing operations, a tow cable system 20 according to aspects of the present invention is configured to reduce tension loads, loading amplification, and shock loads resulting from a phenomenon known as the "bungee effect," which can amplify loading during oscillation resulting from the transition from positive force (cable tension) to negative force (cable slack), such being accomplished through the application of one or more of cable configuration and pre-loading or pre-tensioning, in-flight cable tensioning, and/or cable load dampening. Many such variables are interrelated—for example, by pre-conditioning the tow cable 30 and/or configuring the tow cable 30 from certain materials and weaves to effectively reduce its elasticity, in flight parameters or flight profile may be improved. That is, there is an interplay of the aspects of the system 20 to deliver an optimal tow cable solution, pre-, during- and post-flight, with considerations and performance benefits relating to failure mitigation and response (i.e., in-flight scenarios) and post-launch tow cable take-up or release/retrieval. During flight, there may effectively be provided according to exemplary aspects of the invention triple redundancy relative to the tow cable 30 and its loading (i.e., should its loading exceed desired limits): electronic release as by the "press of button" from either vehicle (the aircraft A or the glider G if manned); mechanical release of the tow cable 30 in the glider G or aircraft A; and a tension rod 62 or other such frangible link in the towed glider G. Once the tow cable 30 is released, again preferably or typically from the glider G, and specifically the nose N attachment H, as illustrated in FIG. 8, and whether as intended so as to then launch the glider G with its launch vehicle L or as a "fail-safe," it will be appreciated that the somewhat conical or foil-shaped glider connector 40 alone or together with a parachute (not shown) or other such structure may be provided on the free end of the cable 30 to keep some tension on the cable 30 after release from the glider G and prevent whipping of the cable 30. Instead or additionally, a take-up reel (not shown) may be provided within the towing aircraft A so as to reel the tow cable 30 in for a safe remainder of the flight and landing and to prevent damage to the cable 30 during landing for possible cable reuse. As a further alternative, the tow cable 30 can be released from the aircraft A once it is closer to the ground so that it is not drug along the ground and potentially damaged as the aircraft A lands. Fundamentally, as depicted schematically in FIG. 1 and described throughout, a key to preventing the "bungee effect" during towed flight of a glider G behind an aircraft A is maintaining positive load or tension therebetween, which is contributed to by cable design/materials, cable pre-tensioning, in-flight cable tensioning, and/or load dampening device(s), and the related interplay of such various components or sub-systems of the overall tow cable system 20.

Aspects of the present specification may also be described as follows:

1. In a first exemplary embodiment of a tow cable system, pre-tensioning the tow cable to a load greater than the expected maximum tow load to reduce subsequent elongation properties of the tow cable, while maintaining an elongation greater than zero.

2. In a second exemplary embodiment of a tow cable system, selecting tow cable material(s) and/or construction configuration that do not return to its original elongation state following initial loading to greater than the expected maximum tow load.

3. In a third exemplary embodiment of a tow cable system, incorporating a tow cable oscillation load dampening device to minimize amplification and/or exacerbating load transference that may exceed the structural capacity of the towing aircraft and/or towed glider.

4. In a fourth exemplary embodiment of a tow cable system, through the use of aerodynamic influences from the towed glider and aircraft acceleration control and maneuvering, maintaining tow cable tension loading to a level greater than zero and less than the maximum structural load capacity.

5. In a fifth exemplary embodiment of a tow cable system, through the use of one and/or a combination of any of embodiments 1-4, maintaining tow cable and tow cable system tension transition from positive to negative such that these transitions do not compound to increase load transfer to the towed glider to levels that exceed the structural capacity of the towed glider.

In closing, regarding the exemplary embodiments of the present invention as shown and described herein, it will be appreciated that a tow cable system and method of use is disclosed and configured in the context of towed flight of a glider behind an aircraft for maintaining positive load or tension of the cable therebetween through one or more of cable design and material selection, cable pre-tensioning, in-flight cable tensioning, and/or load dampening device(s), and the related interplay of such various components or sub-systems of the overall tow cable system. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A tow cable system for air launch from a towed vehicle, the system comprising:
    a tow cable configured to be connected between the towed vehicle and a towing vehicle at respective tow cable connection points;
    at least one load dampening assembly operably engaged with the tow cable, the at least one load dampening assembly comprising a dampening means configured for selectively dampening loading in the tow cable; and
    instrumentation as part of a flight control loop configured particularly for sensing and reporting tow cable loading during use, defining control loop data comprising tow cable tension data, thereby allowing for selective control of one or more variables within the system or the towed or towing vehicles in response to the control loop data, the instrumentation being incorporated within one or more of the at least one load dampening assembly, the tow cable connection points, and the tow cable, wherein the control loop data from the instrumentation is configured to automatically adjust the dampening means in conjunction with the acquisition of updated tow cable tension data as part of the flight control loop;
    whereby the dampening means in conjunction with acquisition of updated tow cable tension data as part of the flight control loop is configured to dampen loading in the tow cable when the towing and towed vehicles are coupled.

2. The system of claim 1, wherein the control loop data further comprises dampening characteristics of the dampening means.

3. The system of claim 1, wherein automatic adjustment of the dampening means is achieved via a servo motor.

4. The system of claim 1, wherein the control loop data from the instrumentation is provided to one or more of the towed vehicle and the towing vehicle for selectively triggering in-flight maneuvers affecting tow cable loading in conjunction with the acquisition of updated tow cable tension data as part of the flight control loop.

5. The system of claim 4, wherein the control loop data from the instrumentation is displayed on a cockpit display of at least one of the towed vehicle and the towing vehicle.

6. The system of claim 1, wherein the instrumentation is incorporated at tow cable connection points for both the towed vehicle and the towing vehicle.

7. The system of claim 1, wherein the tow cable tension data exceeding an allowable maximum triggers release of the tow cable through one or more of electronic release, mechanical release, and frangible link destruction.

8. The system of claim 7, wherein either of the electronic release and the mechanical release are automatic.

9. The system of claim 1, where the at least one load dampening assembly comprises at least a section of the tow cable having particular fibers to provide one or more elongation and load bearing property, whereby the section of the tow cable contributes to selectively dampening loading in the tow cable.

10. The system of claim 1 comprising a plurality of load dampening assemblies.

11. The system of claim 1, wherein the dampening means comprises one or more of a mechanical spring, a hydraulic spring, a pneumatic spring, an electromagnetic spring, and a material of the tow cable.

12. The system of claim 1, wherein the at least one load dampening assembly further comprises a housing and a cable connector operably extending from the housing, the dampening means further configured for biasing the cable connector relative to the housing when the tow cable is operably engaged with the cable connector.

13. The system of claim 12, wherein:
the housing has a side wall and an end wall with an opening formed therein;
the at least one load dampening assembly further comprises a tension rod installed within the housing, the tension rod having a base and a post extending from the base toward the opening in the end wall of the housing; and
the cable connector is engaged with the post of the tension rod through the opening in the end wall of the housing.

14. The system of claim 13, wherein the dampening means is a mechanical spring operably installed within the housing between the end wall of the housing and the base of the tension rod, the mechanical spring thereby biasing the tension rod within the housing away from the end wall.

15. The system of claim 13, wherein the tension rod is configured as a frangible link.

16. The system of claim 13, wherein the cable connector is threadably engaged with the post of the tension rod, such that rotation of the cable connector relative to the tension rod results in selective pre-loading of the dampening means within the housing.

17. The system of claim 1, wherein the load dampening assembly further comprises a swivel mount configured to allow pivoting of the assembly in at least one plane.

18. The system of claim 1, wherein the at least one load dampening assembly is installed on an end of the tow cable configured to be adjacent to the tow cable connection point of the towed vehicle.

19. The system of claim 1, wherein a glider connector formed as a conical shroud is installed on the tow cable adjacent to the at least one dampening assembly for selective engagement with the towed vehicle tow cable connection point and is configured to facilitate attachment or reattachment of the tow cable to the towed vehicle.

20. A tow cable system for air launch from a towed vehicle, the system comprising:
a tow cable configured to be connected between the towed vehicle and a towing vehicle;
at least one load dampening assembly operably engaged with the tow cable, the assembly comprising a dampening means having a housing and a cable connector operably extending from the housing, the dampening means configured for biasing the cable connector relative to the housing, rotation of the cable connector selectively pre-loading the dampening means within the housing, the load dampening assembly further comprising a swivel mount configured to allow pivoting of the assembly in at least one plane; and
instrumentation as part of a flight control loop particularly for sensing and reporting tow cable loading during use, defining control loop data comprising tow cable tension data, the instrumentation being incorporated within one or more of the at least one load dampening assembly and the tow cable, wherein the control loop data from the instrumentation is configured to be provided to one or more of the towed vehicle and the towing vehicle for selectively triggering in-flight maneuvers affecting tow cable loading and the acquisition of updated tow cable tension data as part of the control loop;
whereby the dampening means in conjunction with the control loop is configured to dampen loading in the tow cable when the tow cable is operably engaged with the cable connector and with the towing and towed vehicles airborne.

* * * * *